US008855131B2

(12) United States Patent
Imamura et al.

(10) Patent No.: US 8,855,131 B2
(45) Date of Patent: Oct. 7, 2014

(54) TRANSMISSION DEVICE, TRANSMISSION POWER CONTROL METHOD AND TRANSMISSION DETERMINATION METHOD

(75) Inventors: Daichi Imamura, Kanagawa (JP); Akihiko Nishio, Kanagawa (JP); Seigo Nakao, Kanagawa (JP); Takashi Iwai, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 263 days.

(21) Appl. No.: 13/638,754

(22) PCT Filed: Apr. 1, 2011

(86) PCT No.: PCT/JP2011/001984
§ 371 (c)(1),
(2), (4) Date: Oct. 1, 2012

(87) PCT Pub. No.: WO2011/125319
PCT Pub. Date: Oct. 13, 2011

(65) Prior Publication Data
US 2013/0028214 A1  Jan. 31, 2013

(30) Foreign Application Priority Data
Apr. 5, 2010 (JP) .................................. 2010-086989

(51) Int. Cl.
*H04Q 11/02* (2006.01)
*H04W 4/00* (2009.01)
(52) U.S. Cl.
USPC ........................................... 370/430; 370/329
(58) Field of Classification Search
CPC ..... H04W 80/04; H04W 88/06; H04W 28/04; H04W 72/04; H04L 27/2626; H04L 27/2647
USPC .......................................... 370/328, 329, 430
See application file for complete search history.

(56) References Cited

U.S. PATENT DOCUMENTS

| 2010/0273520 A1* | 10/2010 | Pelletier et al. ............... 455/522 |
| 2010/0284394 A1 | 11/2010 | Takata et al. |
| 2011/0216850 A1 | 9/2011 | Kishiyama et al. |

FOREIGN PATENT DOCUMENTS

| JP | 2010-74760 A | 4/2010 |
| WO | 2009/087741 A1 | 7/2009 |
| WO | 2010/016240 A1 | 2/2010 |

OTHER PUBLICATIONS

3GPP TS36.213 V8.8.0, "3GPP TSG RAN E-UTRA Physical layer procedures (Release 8)".

(Continued)

*Primary Examiner* — Ronald Abelson
(74) *Attorney, Agent, or Firm* — Pearne & Gordon LLP

(57) ABSTRACT

Provided is a transmission device, wherein even when the transmission device performs noncontiguous band allocation transmission, the same level of coverage and gain as when the contiguous band allocation transmission is assumed can be maintained. A transmission power control unit (110), in a second mode, calculates first power on the basis of the transmission power control method using, as the bandwidth of the contiguous bands in the first mode, the bandwidth of a first band with the lowest frequency in a cluster allocated to the lowest band among a plurality of clusters and the highest frequency in a cluster allocated to the highest band among the plurality of clusters as both ends thereof, and calculates the transmission power using the ratio between the bandwidth of the first band and the bandwidth of a second band to which the plurality of the clusters are allocated, and the first power.

11 Claims, 12 Drawing Sheets

(56) References Cited

OTHER PUBLICATIONS

3GPP TS36.101 V8.8.0, "3GPP TSG RAN E-UTRA User Equipment (UE) radio transmission and reception (Release 8)".
R4-100635, Ericsson, ST-Ericsson, "Non-contiguous UE transmission per CC," 3GPP TSG-RAN WG4 Meeting #54, San Francisco, USA, Feb. 22-26, 2010.
R4-100551, Huawei, "Impact of PUSCH and PUCCH on SEM" 3GPP TSG-RAN WG4 Meeting #54, San Francisco, USA, Feb. 22-26, 2010.
R4-100718, NTT DOCOMO, "Simultaneous PUCCH/PUSCH transmission in LTE-A" 3GPP TSG-RAN WG4 Meeting #54, San Francisco, USA, Feb. 22-26, 2010.
Panasonic, Influence of UE power back-off to system performance for clustered PUSCH transmission, 3GPP TSG-RAN WG1 Meeting #60bis R1-102033, Apr. 12, 2010.
International Search Report for PCT/JP2011/001984 dated Jun. 7, 2011.

\* cited by examiner

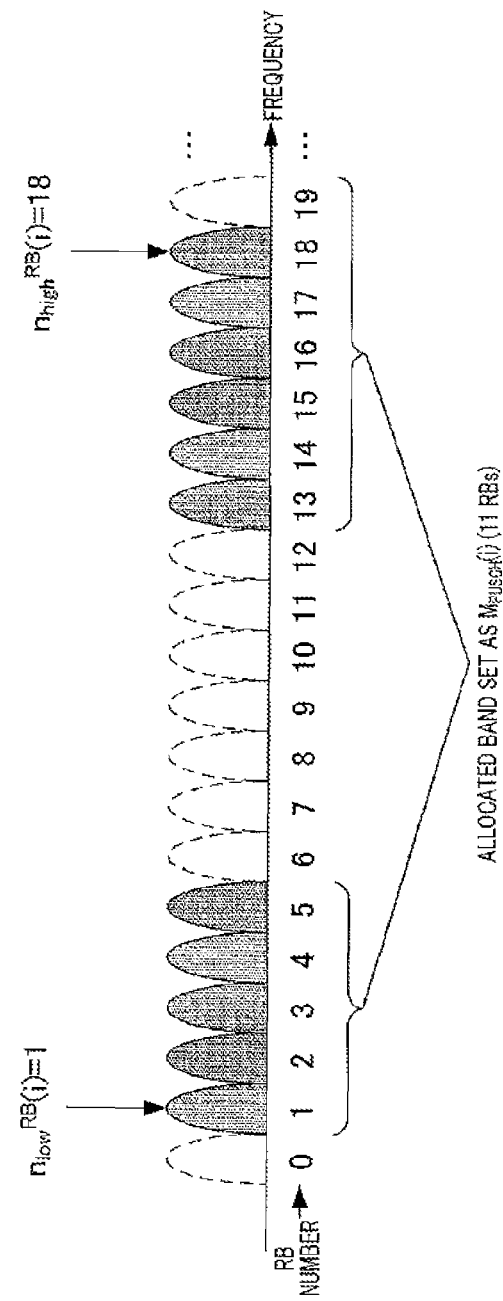

TRANSMISSION DEVICE, TRANSMISSION POWER CONTROL METHOD AND TRANSMISSION DETERMINATION METHOD

TECHNICAL FIELD

The present invention relates to a transmission apparatus, a transmission power control method and a transmission determination method.

BACKGROUND ART

In conventional radio communication systems, non-linear distortion characteristics of amplifier circuits (Power Amplifier (PA)) of transmission apparatuses cause unwanted emissions of radio waves (e.g., Out of Band Emissions (OOBE) and spurious emissions) in frequency bands other than the bands in which transmission signals are transmitted. Accordingly, various measures have been taken for preventing interference due to the unwanted emissions of radio waves, as described above, between each of the radio communication systems and other radio communication systems using a frequency band adjacent to that of the radio communication system (i.e., adjacent radio communication systems).

As a measure for preventing interference with adjacent radio communication systems, a spectrum mask for a transmission power is generally defined in a radio communication system on frequency characteristics of radio signals to be transmitted. Here, the spectrum mask for a transmission power represents an allowable range (e.g., limit value) of the transmission power in each frequency band. Values defined as spectrum masks for transmission powers include, for instance, an out of band emission, a spurious emission, and an Adjacent Channel Leakage power Ratio (ACLR) and the like. Transmission apparatuses in the radio communication systems suppress the amount of out of band emission within a range that does not exceed the spectrum mask (allowable range), thereby avoiding interference between the radio communication systems.

Here, according to the 3GPP (3rd Generation Partner Project) LTE (Long Term Evolution) Release 8 specifications (hereinafter referred to as Rel. 8 LTE), an uplink data channel (PUSCH: Physical Uplink Shared CHannel) is subjected to transmission power control (referred to as Fractional Transmission Power Control (Fractional TPC)) (e.g., see NPL 1). More specifically, the transmission apparatus (i.e., a terminal (UE: User Equipment)) controls transmission power $P_{PUSCH}(i)$ in a subframe i according to a definition of following equation 1.

[1]

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\}[dBm] \quad \text{(Equation 1)}$$

In equation 1, $P_{CMAX}$ represents the maximum transmission power value set from an upper layer; $M_{PUSCH}(i)$ represents a bandwidth (bandwidth allocated for PUSCH transmission) [RB] allocated to PUSCH transmitted by the transmission apparatus using subframe i (i-subframe); $P_{O\_PUSCH}(j)$ represents a received target power value; $\alpha(j)$ represents a coefficient by which a PL (Path Loss or Propagation Loss) estimation value is multiplied; PL represents a propagation loss estimation value estimated by the transmission apparatus (UE) in the downlink; $\Delta_{TF}(i)$ represents an offset value set according to the type of transmission data or modulation scheme (QPSK, 16QAM, etc.); and $f(i)$ represents a cumulative value of transmission power values (control value in a closed loop (closed-TPC)).

Furthermore, Rel. 8 LTE specifies a transmission signal power to be satisfied, by a transmission apparatus (UE) in a frequency band available for an IMT (International Mobile Telecommunication) system (hereinafter referred to as an IMT band) (e.g., see NPL 2). This definition has been made to prevent interference between a 3GPP E-UTRAN system (also referred to as an LTE system) and other radio communication systems (adjacent radio communication systems) using a frequency band adjacent to a frequency band used by the 3GPP E-UTRAN system (LTE system). More specifically, a MPR (Maximum Power Reduction) value is defined. According to the MPR value, the maximum transmission power value set in the transmission apparatus (UE) is reduced according to a modulation scheme used for modulating transmission data, a bandwidth to which transmission data is allocated (allocated bandwidth) or a frequency position at which the transmission data is allocated. Furthermore, in a specific IMT band with a particularly strict specification on a spectrum mask and the like according to radio laws and ordnances in each country, a maximum power reduction (A-MPR: Additional MPR) value for further reducing the maximum transmission power value is set. Accordingly, the transmission apparatus controls a transmission power using the maximum transmission power value ($P_{CMAX}$ in equation 1) in consideration of the MPR value and the A-MPR value.

Rel. 8 LTE adopts SC-FDMA (Single-Carrier Frequency Division Multiple Access) as an uplink multiple access scheme. That is, in Rel 8 LTE, in the uplink, the transmission apparatus (UE) allocates transmission signals to resources contiguous in frequency and transmits the signals (hereinafter, referred to as "contiguous hand allocation transmission), i.e., performs single-carrier transmission. Thus, in Rel. 8 LTE, the MPR value and A-MPR value are set on the basis of the transmission bandwidth, frequency position and the like for the contiguous band allocation transmission (single-carrier transmission).

As an expanded system of Rel. 8 LTE, standardization of LTE Release 10 specifications (hereinafter, referred to as Rel. 10 LTE; also referred to as LTE-Advanced System) has been started. In Rel. 10 LTE, there has been discussed allocation of PUSCH to non-contiguous frequencies and transmission thereof (non-contiguous band allocation transmission of PUSCH), and simultaneous transmission, of PUSCH and a control channel (PUCCH: Physical Uplink Control CHannel) (simultaneous transmission of PUSCH and PUCCH) (e.g., see NPLs 3, 4 and 5) in addition to contiguous band allocation transmission (single-carrier transmission) applied to Rel. 8 LTE. That is, in Rel. 10 LTE, multicarrier transmission (non-contiguous band allocation transmission) in the uplink, in addition to the single-carrier transmission (contiguous hand allocation transmission), has been discussed.

In this way, it is made possible to allocate transmission signals to a frequency band having a favorable channel quality and then transmit the signals depending on the frequency response characteristics of a channel for each transmission apparatus (UE). Accordingly, improvement in the throughput characteristics of each transmission apparatus (UE) as well as an increase in the system capacity in the uplink can be expected in Rel. 10 LTE in comparison with Rel. 8 LTE.

CITATION LIST

Non-Patent Literature

NPL 1
3GPP TS36.213 V8.8.0, "3GPP TSG RAN E-UTRA Physical layer procedures (Release 8)"
NPL 2
3GPP TS36.101 V8.8.0, "3GPP TSG RAN E-UTRA User Equipment (UE) radio transmission and reception (Release 8)"

NPL 3
R4-100635, Ericsson, ST-Ericsson, "Non-contiguous UE transmission per CC," 3GPP TSG-RAN WG4 Meeting #54, San Francisco, USA, 22-26 Feb. 2010,
NPL 4
R4-100551, Huawei, "Impact of PUSCH and PUCCH on SEM" 3GPP TSG-RAN WG4 Meeting #54, San Francisco, USA, 22-26 Feb. 2010.
NPL 5
R4-100718, NTT DOCOMO, "Simultaneous PUCCH/PUSCH transmission in LTE-A" 3GPP TSG-RAN WG4 Meeting #54, San Francisco, USA, 22-26 Feb. 2010.

SUMMARY OF INVENTION

Technical Problem

As described above, the MPR value (A-MPR value) set in Rel. 8 LTE is set so as to satisfy specifications, such as on a spectrum mask for each IMT band, for contiguous band allocation transmission (single-carrier transmission). Accordingly, in the case of adopting non-contiguous band allocation transmission (muilticarrier transmission) in Rel. 10 LTE, use of the MPR value (A-MPR value) set in Rel. 8 LTE without any change causes the possibility of transmitting transmission data at an emission amount exceeding the spectrum mask of each IMT band.

For instance, FIG. 1 shows the relationship between transmission power and frequency in a non-contiguous band allocation transmission (i.e., multicarrier transmission), as with Rel. 10 LTE (solid line), and a contiguous band allocation transmission (single-carrier transmission), as with Rel. 8 LTE (dotted line), in a system band having a frequency bandwidth of MHz (10 MHz channel (−5 to 5 MHz) shown in FIG. 1). In FIG. 1, portions of transmission data to be multicarrier-transmitted are non-contiguously allocated between opposite ends of the system band (that is, approximately between −5 MHz and 5 MHz). Transmission data to be single-carrier-transmitted is contiguously allocated to one end (approximately −5 MHz) of the system band. In FIG. 1, the maximum transmission power value (23 dBm+tolerance) and the spectrum mask in Rel. 8 LTE are set.

As shown in FIG. 1, a non-linear distortion component of PA (component of out of band emission, or spurious component; hereinafter, referred to as spuriousness) occurs in a frequency band other than the frequency band (system band) allocated to transmission data. However, as shown in FIG. 1, in the spectrum (dotted line) of transmission data subjected to contiguous band allocation transmission (single-carrier trans mission), spuriousness exceeding the spectrum mask (allowable range) does not occur. In contrast, as shown in FIG. 1, in the spectrum (solid line) of transmission signals subjected to non-contiguous band allocation transmission (multicarrier transmission), spuriousness generated by higher-order (third, fifth and seventh) intermodulation distortion components exceed the allowable range, such as a spectrum mask.

Accordingly, in Rel. 10 LTE, it is required to newly set an MPR value (A-MPR value) for non-contiguous band allocation transmission (multicarrier transmission).

As a method of newly setting an MPR value (A-MPR value), a method can be considered that sets an appropriate MPR value (an A-MPR value) for each non-contiguous frequency band allocation situation where transmission signals (PUSCH, PUCCH) are allocated. However, the MPR value (A-MPR value) is different depending on the bandwidth of a transmission signal, a frequency position at which the transmission signal is allocated, and the number of resource blocks (the number of allocation RBs (Resource Blocks)) to which the transmission signal is allocated. The method of setting an MPR value (A-MPR value) in each non-contiguous frequency band allocation situation causes an increase in test man-hours required for setting and an increase in the complexity of the configuration of the transmission apparatus.

Thus, as a new method of simply setting an MPR value (A-MPR value), a method can be considered that sets only a few (e.g., one or two) MPR values (A-MPR values) for the worst non-contiguous band allocation situation and a strictly defined particular IMT band, such as a spectrum mask. This enables suppression of spuriousness exceeding an allowable range, such as a spectrum mask without setting an MPR value (A-MPR value) for each non-contiguous frequency band allocation situation (e.g., the bandwidth of a transmission signal, the frequency position at which the transmission signal is allocated, the number of resource blocks to which the transmission signal is allocated), and even in any non-contiguous frequency band allocation situation. However, this case always uses an MPR value (A-MPR value) for the worst non-contiguous band allocation situation and a strictly defined particular IMT band, such as on a spectrum mask. Accordingly, the transmission power is unnecessarily restricted even in the case where the amount of unwanted emission beyond the band is sufficiently within the allowable range. This causes a problem in that an optimal coverage and an optimal gain cannot be acquired.

It is an object of the present invention to provide a transmission apparatus, a transmission power control method, and a transmission determination method that are capable of reusing the transmission power control method in Rel. 8 LTE for contiguous band allocation transmission and also of maintaining coverage and a gain equivalent to those under assumption of contiguous band allocation transmission without adding a new parameter for controlling transmission power.

Solution to Problem

A transmission apparatus reflecting a first aspect of the present invention is a transmission apparatus that uses a first mode for allocating transmission data to a contiguous frequency band and a second mode for dividing the transmission data into a plurality of clusters and allocating the plurality of clusters to non-contiguous frequency bands, the apparatus including: a control section that controls a transmission power of the transmission data in accordance with the first mode or the second mode; and a transmission section that transmits the transmission data at the transmission power, in which, in the first mode, the control, section sets the transmission power on the basis of a transmission power control method set for the contiguous frequency band, and in the second mode, the control section sets a bandwidth of a first frequency band ranging from a lowest frequency in a cluster allocated to a lowest frequency band among the plurality of clusters to a highest frequency in a cluster allocated to a highest frequency band among the plurality of clusters, both frequencies being inclusive, as a bandwidth of the contiguous frequency band in the first mode, and calculates a first power on the basis of the set contiguous frequency band and the transmission power control method, and the control section calculates the transmission power, using the first power and a ratio between the bandwidth of the first frequency band and a bandwidth of a second frequency band including the plurality of non-contiguous frequency bands to which the clusters are allocated.

A transmission apparatus reflecting a second aspect of the present invention is a transmission apparatus that separately controls a transmission power of first transmission data and a transmission power of second transmission data, the apparatus including: a determination section that compares a determination parameter with a determination reference and then determines whether to simultaneously transmit the first transmission data and the second transmission data or transmit only any one of the first transmission data and the second transmission data; and a transmission section that transmits the first transmission data and the second transmission data on the basis of a determination result of the determination section, in which the determination parameter is a power value calculated as a product of: a first parameter that is a higher transmission power per unit frequency between a first transmission power spectral density that is a transmission power per unit frequency of the first transmission data, and a second transmission power spectral density that is a transmission power per unit frequency of the second transmission data; and a second parameter that is a bandwidth of a frequency band ranging from a lowest frequency in the transmission data allocated to a lowest frequency band between the first transmission data and the second transmission data to a highest frequency in the transmission data allocated to a highest frequency band between the first transmission data and the second transmission data, both frequencies being inclusive.

A transmission power control method reflecting a third aspect of the present invention is a transmission power control method in a transmission apparatus using a first mode for allocating transmission data to a contiguous frequency band and a second mode for dividing the transmission data into a plurality of clusters and allocating the plurality of clusters to non-contiguous frequency bands, the method including: controlling a transmission power of the transmission data in accordance with the first mode or the second mode; transmitting the transmission data at the controlled transmission power; in the first mode, setting the transmission power on the basis of a transmission power control technique set for the contiguous frequency band; in the second mode, setting a bandwidth of a first frequency band ranging from a lowest frequency in the cluster allocated to a lowest frequency band among the plurality of clusters to a highest frequency in the cluster allocated to a highest frequency band among the plurality of clusters, both frequencies being inclusive, as a bandwidth of the contiguous frequency band in the first mode, and calculating a first power on the basis of the set contiguous frequency band and the transmission power control technique; and calculating the transmission power, using the first power and a ratio between the bandwidth of the first frequency band and a bandwidth of a second frequency band that includes the non-contiguous frequency bands to which the respective clusters are allocated.

A transmission determination method reflecting a fourth aspect of the present invention is a transmission determination method in a transmission apparatus separately controlling a transmission power of first transmission data and a transmission power of second transmission data, the method including: comparing a determination parameter with a determination reference, and determining whether to simultaneously transmit the first transmission data and the second transmission data or transmit only any one of the first transmission data and the second transmission data; and transmitting the first transmission data and the second transmission data on the basis of a result of the determining, in which the determination parameter is a power value calculated as a product of: a first parameter that is a higher transmission power per unit frequency between a transmission power per unit frequency of the first transmission data and a transmission power per unit frequency of the second transmission data; and a second parameter that is a bandwidth of a frequency band ranging from a lowest frequency in the transmission data allocated to a lowest frequency band between the first transmission data and the second transmission data to a highest frequency in the transmission data allocated to a highest frequency band between the first transmission data and the second transmission data, both frequencies being inclusive.

Advantageous Effects of Invention

The present invention is capable of reusing the transmission power control method in Rel. 8 LTE for contiguous band allocation transmission and also of maintaining coverage and a gain equivalent to those under assumption of contiguous band allocation transmission without adding a new parameter for controlling transmission power, even when the transmission apparatus performs a non-contiguous band allocation transmission.

BRIEF DESCRIPTION OF DRAWING

FIG. 4 is a diagram showing a process of controlling a transmission power according to Embodiment 1 of the present invention;

FIG. 5 is a diagram showing a process of controlling a transmission power according to Embodiment 1 of the present invention;

DESCRIPTION OF EMBODIMENTS

Embodiments of the present invention will now be described in detail with reference to accompanying drawings.

A transmission apparatus according to the present invention is included, for instance, in UE.

(Embodiment 1)

The transmission apparatus (UE) according to the present invention is configured to support both a single-carrier transmission mode (contiguous band allocation transmission), which allocates transmission data to a contiguous frequency band, and a multicarrier transmission mode (non-contiguous band allocation transmission), which allocates portions of transmission data to respective a plurality of non-contiguous frequency bands. That is, the transmission apparatus according to this embodiment transmits transmission data to a reception apparatus (BS (Base Station) or eNB), not shown, according to single-carrier transmission or multicarrier transmission.

In the following description, the transmission apparatus transmits user data (PUSCH) as transmission data. For instance, in multicarrier transmission, the transmission apparatus adopts clustered DFT-s-OFDM (clustered Discrete Fourier Transform-spread-Orthogonal Frequency Division Multiplexing) scheme to transmit transmission data. In the clustered DFT-s-OFDM scheme, the transmission data (PUSCH) is divided for a plurality of contiguous bands (hereinafter, referred to as clusters). The plurality of clusters are allocated to respective non-contiguous frequency bands.

Figure 1:
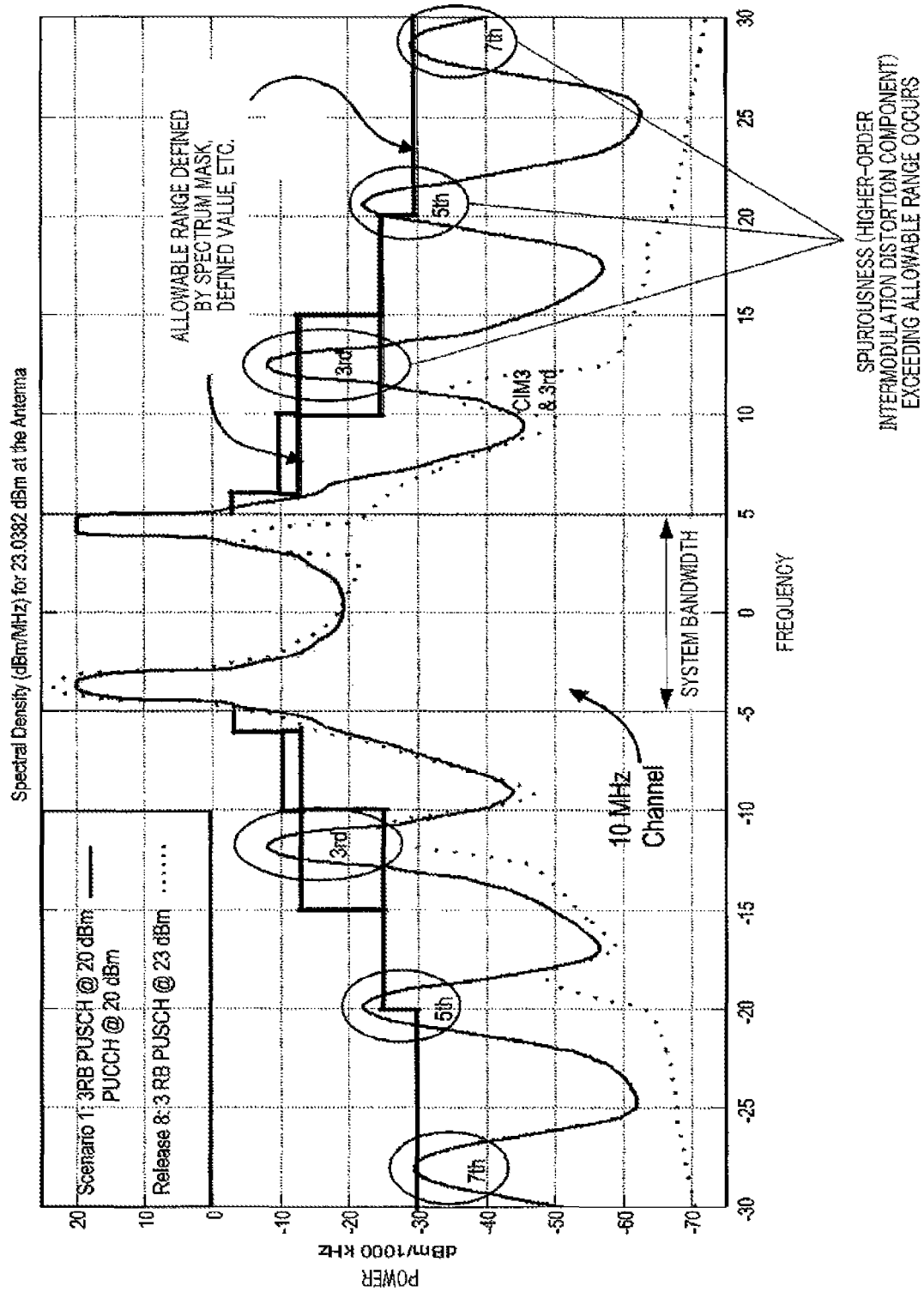
FIG. 1 is a diagram showing the relationship between transmission power and frequency in a single-carrier transmission and a multicarrier transmission.
Figure 2:
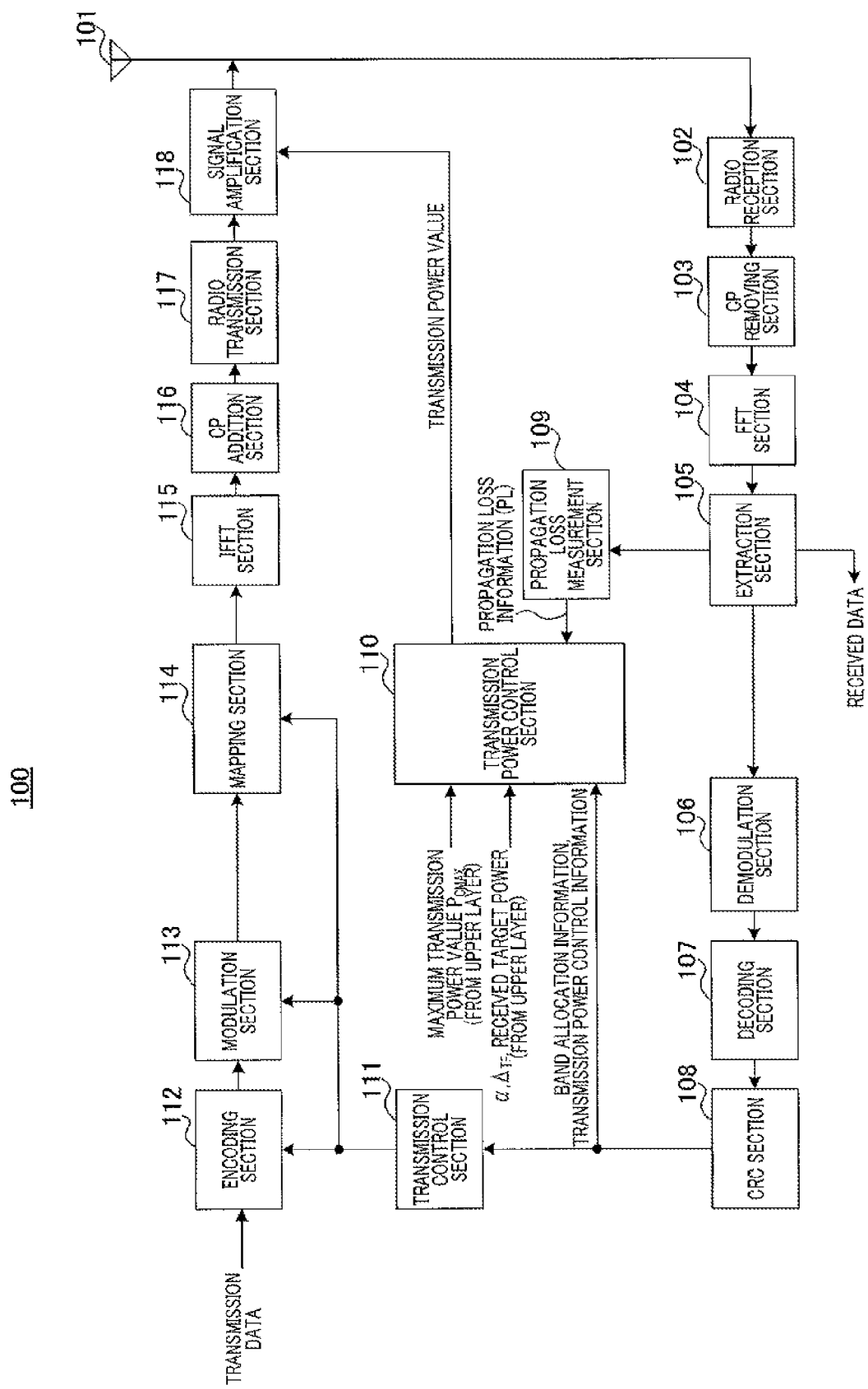
FIG. 2 is a block diagram showing a configuration of a transmission apparatus according to Embodiment 1 of the present invention.

FIG. 2 shows the configuration of transmission apparatus 100 (UE) according to this embodiment. In transmission apparatus 100 shown in FIG. 2, radio reception section 102 receives OFDM symbols transmitted from a reception apparatus (eNB) via antenna 101, performs reception processes, such as downconversion and A/D conversion, on the received OFDM symbols, and outputs the reception-processed OFDM symbols to CP removing section 103.

CP removing section 103 removes CP added to the reception-processed OFDM symbols, and outputs the OFDM symbols, from which the CP has been removed, to FFT (Fast Fourier Transform) section 104.

FFT section 104 performs FFT on the OFDM symbols without CP to acquire a received signal having subcarriers onto which a pilot signal, control information or downlink data is mapped, and outputs the acquired received signal to extraction section 105. The control information includes band allocation information (radio resource allocation information) that indicates a frequency band allocated for signal transmission of transmission apparatus 100, and transmission power control information that indicates information pertaining to closed loop transmission power control.

In receiving the control information, extraction section 105 extracts the control information notified by the reception apparatus (eNB) from the plurality of subcarriers of the received signal output from FFT section 104, and outputs the control information to demodulation section 106. The control information is demodulated by demodulation section 106 and then input to decoding section 107. The control information input from demodulation section 106 is decoded by decoding section 107 and input into CRC section 108. Meanwhile, in reception of downlink data, extraction section 105 extracts the downlink data, which is destined to transmission apparatus 100, from the subcarriers of the received signal output from FFT section 104, according to radio resource allocation result previously notified by the reception apparatus (eNB), and outputs the extracted downlink data as received data. Extraction section 105 outputs the received signal, which includes at least one of the downlink data and the pilot signal, to propagation loss measurement section 109.

CRC section 108 performs CRC (Cyclic Redundancy Check) determination of each portion of the control information (e.g., band allocation information, transmission power control information) input from decoding section 107. When determining that the control information has been correctly received, CRC section 108 outputs the band allocation information and the transmission power control information to transmission power control section 110 and transmission control section 111.

Propagation loss measurement section 109 measures propagation loss (PL) of the signal transmitted from the reception apparatus (eNB) using the data signal (downlink data), the pilot signal, or both the data signal and the pilot signal, which are included in the received signal input from extraction section 105. Propagation loss measurement section 109 outputs propagation loss information (PL) representing the measured propagation loss, to transmission power control section 110.

Transmission power control section 110 determines the transmission power of transmission data to be transmitted, on the basis of the band allocation information (i.e., whether the transmission mode is a single-carrier transmission mode or a multicarrier transmission mode), the transmission power control information, the control information (parameters, such as the maximum transmission power value $P_{CMAX}$, a received target power, a coefficient α by which the propagation loss is multiplied, and an offset value $\Delta_{TF}$ set corresponding to the transmission data type or the modulation scheme (QPSK, 16QAM, etc.) type), and the propagation loss information (PL). The band allocation information and the transmission power control information are input from CRC section 108. The control information, the received target power, the coefficient α, and the offset value or the modulation scheme are previously input from the upper layer (not shown). The propagation loss information (PL) is input from propagation loss measurement section 109. Transmission power control section 110 controls signal amplification section 118 such that the transmission power of the transmission data becomes the determined transmission power value, by inputting the determined transmission power value to signal amplification section 118. Details of the process of controlling the transmission power in transmission power control section 110 will be described later.

Transmission control section 111 controls transmission of the transmission data, on the basis of the band allocation information notified from the reception apparatus (eNB). More specifically, transmission control section 111 outputs a code rate, the modulation scheme, and physical resource position information indicating a physical, resource position (i.e., position of an RB: Resource Block) to encoding section 112, modulation section 113, and mapping section 114, respectively, on the basis of the allocated radio resource and transmission parameters, which are indicated by the band allocation information input from CRC section 108.

Encoding section 112 encodes the transmission data according to the code rate input from transmission control section 111, and outputs the encoded transmission data (encoded bit string) to modulation section 113.

Modulation section 113 modulates the transmission data (encoded bit string) input from encoding section 112, according to the modulation scheme input from transmission control section 111, and outputs the modulated transmission data to mapping section 114.

Mapping section 114 maps the transmission data input from modulation section 113 onto physical resources indicated by physical resource position information input from transmission control section 111, and outputs signals having a plurality of subcarriers corresponding to the physical resources onto which the transmission data are mapped to IFFT (Inverse Fast Fourier Transform) section 115. Mapping section 114 maps control information (not shown) onto the physical resources secured for the control information, and outputs signals having a plurality of subcarriers corresponding to the physical resources onto which the control information is mapped, to IFFT section 115.

IFFT section 115 performs IFFT on the signals having the plurality of subcarriers onto which the control data (not shown) or the transmission data is mapped, to thereby generate an SC-FDMA symbol, and outputs the generated SC-FDMA symbol to CP (Cyclic Prefix) addition section 116.

CP addition section 116 adds, as CP, a signal, identical to the last part of the SC-FDMA symbol input from the IFFT section 115, to the top of the SC-FDMA symbol, and outputs the signal-added SC-FDMA symbol to radio transmission section 117.

Radio transmission section 117 performs transmission processes, such as D/A conversion, amplification and upconversion, on the CP-added SC-FDMA symbol input from CP addition section 116 and outputs, as a transmission signal, the SC-FDMA subjected to the transmission processes, to signal amplification section 118.

Signal amplification section 118 amplifies the transmission signal input from radio transmission section 117 so that the transmission power value (transmission power controlled by transmission power control section 110) input from transmission power control section 110 can be obtained, and transmits the amplified transmission signal to the reception apparatus (eNB) from antenna 101.

Details of the process for controlling the transmission power in transmission power control section 110 of transmission apparatus 100 will now be described.

Figure 3:
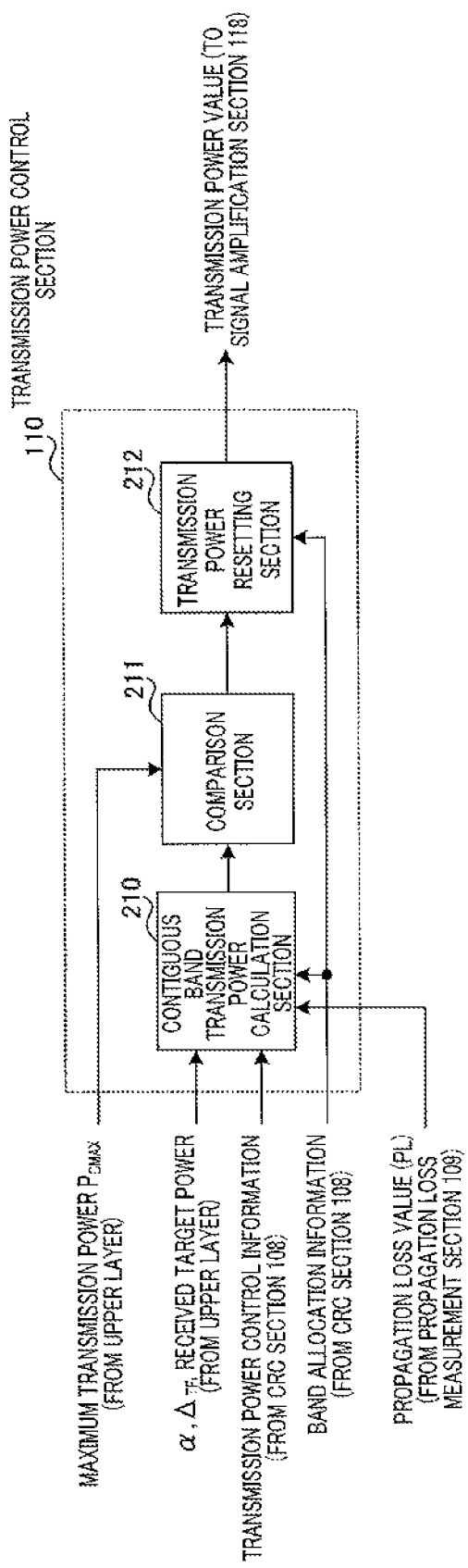
FIG. 3 is a block diagram showing an internal configuration of a transmission power control section according to Embodiment 1 of the present invention.

FIG. 3 shows the internal configuration of transmission power control section 110. In transmission power control section 110 shown in FIG. 3, contiguous band transmission power calculation section 210 calculates the transmission power $P_C(i)$ in the i-th subframe according to equation 2 by assuming that the frequency band (allocated band of transmission apparatus 100) allocated to transmission apparatus 100 is a contiguous band, on the basis of the band allocation information input from CRC section 108. Contiguous band transmission power calculation section 210 then outputs the calculated transmission power $P_C(i)$ to comparison section 211.

[2]

$$P_C(i)=10\log_{10}(M_C(i))+P_{O\_PUSCH}(j)+\alpha(j)\cdot PL+\Delta_{TF}(i)+f(i)[dBm] \quad \text{(Equation 2)}$$

In equation 2, $P_{O\_PUSCH}(j)$ represents the received target power value, $\alpha(j)$ represents a coefficient by which the propagation loss (PL) value set in the upper layer is multiplied, PL represents the propagation loss value measured by propagation loss measurement section 109. In addition, $\Delta_{TF}(i)$ represents the offset value that corresponds to the transmission data type or the modulation scheme (QPSK, 16QAM, etc.) type and has been set in the upper layer, and f(i) represents the cumulative value of transmission power values (control value of Closed-TPC) received, as input from CRC section 108. The parameters and the transmission power calculating equation represented in equation 2 are examples, and the parameters and the transmission power calculating equation are not limited thereto. For instance, equation 2 does not necessarily include the parameters, such as $\alpha(j)$, $\Delta_{TF}(i)$ and f(i). Other parameters may be adopted instead.

In equation 2, $M_C(i)$ represents a transmission bandwidth (where the unit is RB) for the transmission data in i-th subframe for the band allocated to transmission apparatus 100 is a contiguous band. That is, contiguous band transmission power calculation section 210 sets transmission bandwidth $M_C(i)$ according to whether the band allocated to transmission apparatus 100, represented in the band allocation information input from CRC section 108, is contiguous or non-contiguous.

More specifically, in the case where the band allocated to transmission apparatus 100 is contiguous (that is, the single-carrier transmission (or contiguous band allocation) mode), contiguous band transmission power calculation section 210 sets the number of RBs allocated to the transmission data, as transmission bandwidth $M_C(i)[RB]$.

Otherwise, when the band allocated to transmission apparatus 100 is non-contiguous (that is, the multicarrier transmission (or non-contiguous band allocation) mode), contiguous band transmission power calculation section 210 sets transmission bandwidth $M_C(i)[RB]$, using RB index $n_{low}^{RB}$ at the lowest frequency in a cluster allocated to the lowest frequency band among the plurality of clusters generated by dividing the transmission data and RB index $n_{high}^{RB}$ at the highest frequency in a cluster allocated to the highest frequency band among the plurality of clusters, according to equation 3.

[3]

$$M_C(i)=n_{high}^{RB}-n_{low}^{RB}+1 [RB] \quad \text{(Equation 3)}$$

For instance, as shown in FIGS. 4 and 5, the case where eleven RBs, having indexes 1 to 5 and 13 to 18, are allocated to transmission apparatus 100 will be described. That is, in FIGS. 4 and 5, two clusters generated by dividing the transmission data are respectively allocated to five contiguous RBs having indexes 1 to 5 and six contiguous RBs having indexes 13 to 18.

Accordingly, as shown in FIG. 4, when the band allocated to transmission apparatus 100 is non-contiguous, contiguous band transmission power calculation section 210 identifies the RB index $n_{low}^{RB}=1$ at the lowest frequency in the cluster (RBs having RB indexes 1 to 5) allocated to the lowest frequency band among the clusters, and the RB index $n_{high}^{RB}=18$ at the highest frequency in the cluster (RBs having RB indexes 13 to 18) allocated to the highest frequency band among the clusters. As shown in FIG. 4, contiguous band transmission power calculation section 210 sets transmission bandwidth $M_C(i)=18-1+1=18$ [RB], using $n_{low}^{RB}=1$ and $n_{high}^{RB}=18$, according to equation 3.

Thus, in the case where the band allocated to transmission apparatus 100 is non-contiguous, contiguous band transmission power calculation section 210 sets a frequency band (transmission bandwidth $M_C(i)$ in FIG. 4, 18 RBs having RB indexes 1 to 18) ranging from the lowest frequency in the cluster allocated to the lowest frequency band to the highest frequency in the cluster allocated to the highest frequency band among the bands allocated to transmission apparatus 100 (a plurality of non-contiguous frequency bands to which a plurality of clusters are allocated), both frequencies inclusive, as the contiguous frequency band in the contiguous band allocation transmission (single-carrier transmission). Contiguous band transmission power calculation section 210 calculates transmission power $P_C(i)$ for the contiguous band allocation transmission on the basis of the set contiguous frequency band. That is, in FIG. 4, contiguous band transmission power calculation section 210 calculates transmission power $P_C(i)$ for contiguous band allocation transmission including the frequency band (seven RBs having RB indexes 6 to 12 in FIG. 4) that is not actually allocated to transmission apparatus 100, on a transmission signal where the actual frequency band allocation to transmission apparatus 100 is non-contiguous band allocation of 11 RBs.

Note that, with reference to FIGS. 4 and 5, the case where the RB indexes are continuously assigned in an ascending order from a lower frequency has been described. However, in essence, contiguous band transmission power calculation section 210 calculates the transmission power with an assumption that a contiguous frequency band, which includes the lowest frequency RB and the highest frequency RB among the bands allocated to transmission, apparatus 100 (frequency band ranging from the lowest frequency RB to the highest frequency RB), is allocated to the transmission apparatus 100.

Next, comparison section 211 shown in FIG. 3 compares transmission power $P_C(i)$ input from contiguous band transmission power calculation section 210 with maximum transmission power value $P_{CMAX}$ input from the upper layer, using following equation 4. As a result of the comparison, one of transmission power $P_C(i)$ and maximum transmission power value $P_{CMAX}$ that has been determined as a lower value is output as transmission power value $P'_C(i)$ to transmission power resetting section 212. Maximum transmission power value $P_{CMAX}$ is the maximum transmission power value including the MPR value and A-MPR value set depending on a frequency band position of the system band and the like.

[4]

$$P'_C(i) = \min\{P_{CMAX}, P_C(i)\}[\text{dBm}] \quad \text{(Equation 4)}$$

Next, transmission power resetting section 212 shown in FIG. 3 sets a transmission power value for the transmission data on the basis of band allocation information input from CRC section 108.

More specifically, when the band allocated to transmission apparatus 100 indicated in the band allocation information as being contiguous (the case of the single-carrier transmission (contiguous band allocation) mode), transmission power resetting section 212 sets transmission power value $P'_C(i)$ input from comparison section 211, as transmission power value $P_{PUSCH}(i)$ for the transmission data.

[5]

$$P_{PUSCH}(i) = P'_C(i)[\text{dBm}] \quad \text{(Equation 5)}$$

That is, in the case where bands allocated to transmission apparatus 100 are contiguous, transmission power control section 110 controls transmission power value $P_{PUSCH}(i)$ using equations 2, 4 and 5. Here, the combination of equations 2, 4 and 5 is equivalent to equation 1 (the transmission power control method of Rel. 8 LTE; i.e., the transmission power control method is set by assuming a contiguous band allocation transmission).

Meanwhile, when bands allocated to transmission apparatus 100 indicated in the band allocation information as being non-contiguous (the case of the multicarrier transmission (non-contiguous band allocation) mode), transmission power resetting section 212 sets transmission power value $P_{PUSCH}(i)$ for the transmission data, using the number of RBs $M_{PUSCH}(i)$ actually allocated to transmission apparatus 100, according to following equation 6.

[6]

$$P_{PUSCH}(i) = P'_C(i) + 10\log_{10}\left(\frac{M_{PUSCH}(i)}{M_C(i)}\right)[\text{dBm}] \quad \text{(Equation 6)}$$

For instance, as shown in FIG. 5, the number of RBs $M_{PUSCH}(i)$ actually allocated to transmission apparatus 100 is 11 RBs. Accordingly, in FIG. 5, transmission power resetting section 212 sets transmission power $P_{PUSCH}(i)$ to $(P'_C(i)+10\log_{10}(11/18))$ in equation 6.

That is, when bands allocated to transmission apparatus 100 are non-contiguous, transmission power control section 110 controls transmission power value $P_{PUSCH}(i)$ using equations 2, 4 and 6. Here, in non-contiguous band allocation transmission (multicarrier transmission), transmission power control section 110 calculates transmission power $P_{PUSCH}(i)$ for the number of RBs actually allocated to transmission apparatus 100 (in FIG. 5, $M_{PUSCH}(i)=11$ RBs) among transmission powers ($P_C(i)$ or $P_{CMAX}$) calculated according to equation 6 by assuming contiguous band allocation in equations 2 and 4. That is, transmission power control section 110 (transmission power resetting section 212) sets transmission power value $P_{PUSCH}(i)$, using the ratio between bandwidth $M_{PUSCH}(i)$ of the frequency band allocated to the transmission data (i.e., a plurality of clusters) and bandwidth $M_C(i)$ of the frequency band ranging from the lowest frequency to the highest frequency in the frequency band allocated to the transmission data (i.e., clusters), and transmission power value $P_C'(i)$.

Figure 6:
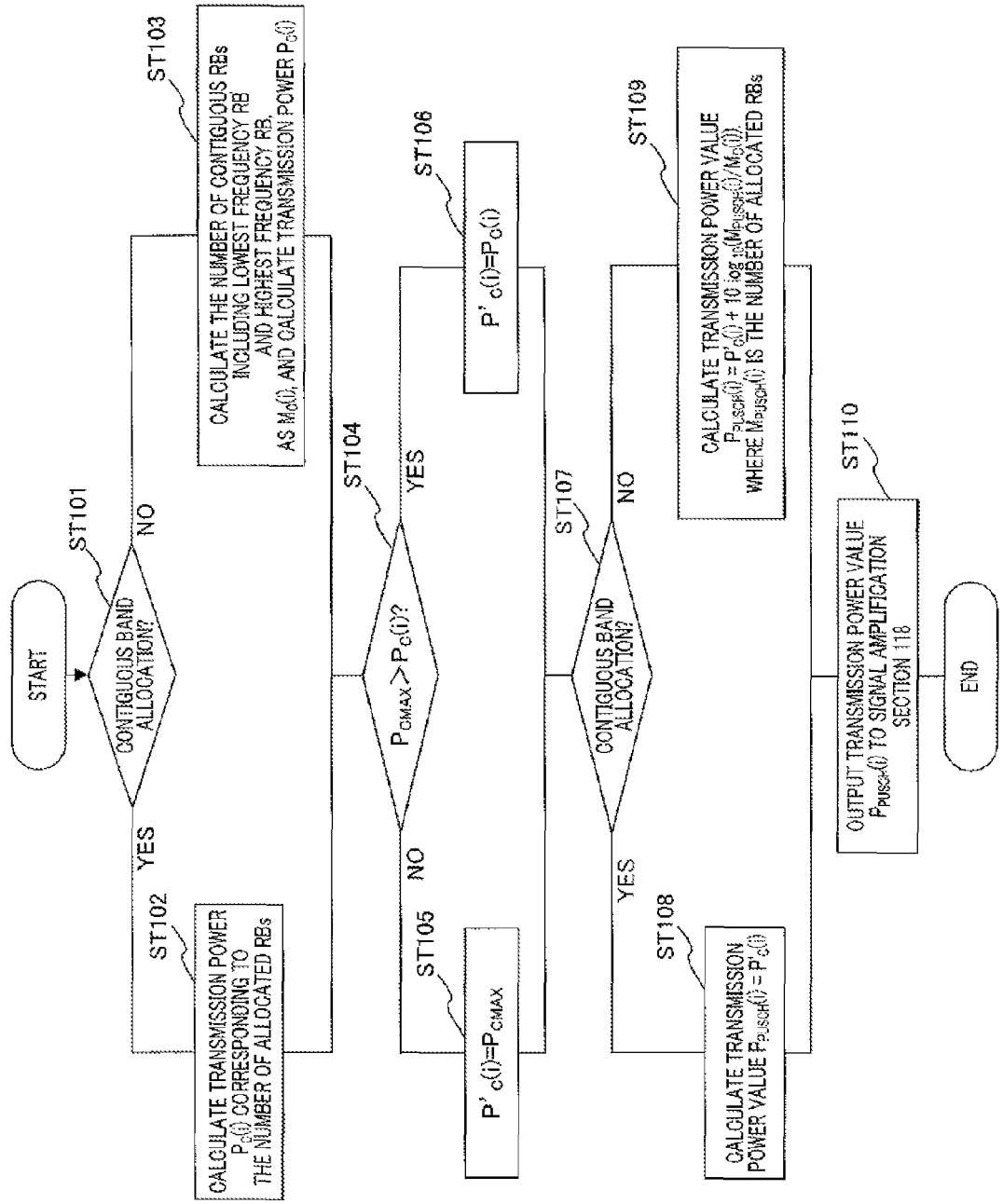
FIG. 6 is a diagram showing a flow of controlling a transmission power according to Embodiment 1 of the present invention.

Next, the flow of the process of controlling the transmission power in transmission power control section 110 will be described. FIG. 6 is a flowchart showing the process flow for controlling the transmission power in transmission power control section 110.

In FIG. 6, in step (hereinafter, referred to as ST) 101, transmission power control section 110 (contiguous band transmission power calculation section 210) determines whether the bands allocated to transmission apparatus 100 are contiguous or not; that is, whether the frequency band allocation to transmission apparatus 100 is contiguous band allocation or not. If the frequency band allocation to transmission apparatus 100 is contiguous band allocation (ST101: YES), that is, in the case of the single-carrier transmission mode, in ST102 contiguous band transmission power calculation section 210 calculates transmission power value $P_C(i)$ corresponding to the number of RBs allocated to transmission apparatus 100 (the number of allocated RBs). In other words, contiguous band transmission power calculation section 210 calculates transmission power value $P_C(i)$ according to equation 2, where the number of allocated RBs of transmission apparatus 100 is transmission bandwidth $M_C(i)$.

Meanwhile, if the frequency band allocation to transmission apparatus 100 is non-contiguous band allocation (ST101: NO), that is, in the case of the multicarrier transmission mode, in ST103, contiguous band transmission power calculation section 210 sets, as transmission bandwidth $M_C(i)$, the number of RBs (e.g., 18 RBs in FIG. 4) corresponding to the contiguous frequency band ranging from the RB corresponding to the lowest frequency in the cluster allocated to the lowest frequency band (e.g., $n_{low}^{RB}=1$, shown in FIG. 4) to the RB corresponding to the highest frequency in the cluster allocated to the highest frequency band (e.g., $n_{high}^{RB}=18$, shown in FIG. 4) among RBs allocated to the transmission data (i.e., a plurality of clusters) to be transmitted by transmission apparatus 100. Contiguous band transmission power calculation section 210 then calculates transmission power value $P_C(i)$, using set transmission bandwidth $M_C(i)$, according to equation 2.

In ST104, transmission power control section 110 (comparison section 211) compares maximum transmission power value $P_C$ MAX input from the upper layer with transmission power value $P_C(i)$ calculated in ST102 or ST103 (equation 4). If the maximum transmission power value $P_{CMAX}$ is equal to or lower than transmission power value $P_C(i)$ (ST104: NO), comparison section 211 outputs maximum transmission power value $P_{CMAX}$ as transmission power value $P'_C(i)$ to transmission power resetting section 212 represented in equation 4 in ST105.

Meanwhile, if the maximum transmission power value $P_{CMAX}$ is higher than transmission power value $P_C(i)$ (ST104: YES), in ST106, comparison section 211 outputs transmission power value $P_C(i)$ as transmission power value $P'_C(i)$ to transmission power resetting section 212 as represented in equation 4.

In ST107, transmission power control section 110 (transmission power resetting section 212) determines whether the frequency band allocation to transmission apparatus 100 is contiguous band allocation or not, as in ST101. If the frequency band allocation to transmission apparatus 100 is contiguous band allocation (ST107: YES), transmission power resetting section 212 calculates transmission power value $P'_C(i)$ defined in ST105 or ST106, as transmission power value $P_{PUSCH}(i)$ for the transmission data (equation 5).

Meanwhile, if the frequency band allocation to transmission apparatus 100 is non-contiguous band allocation (ST107: NO), transmission power resetting section 212 calculates transmission power value $P_{PUSCH}(i)$ for the transmission data, using transmission power value $P'_C(i)$ defined in ST105 or ST106, according to equation 6.

In ST110, transmission power control section 110 (transmission power resetting section 212) outputs transmission power value $P_{PUSCH}(i)$ for the transmission data calculated in ST108 or ST109 to signal amplification section 118.

Next, the principle of the present invention will be described using a diagram of the relationship between frequency and emission power (radiant power) shown in FIG. 7.

Figure 7:
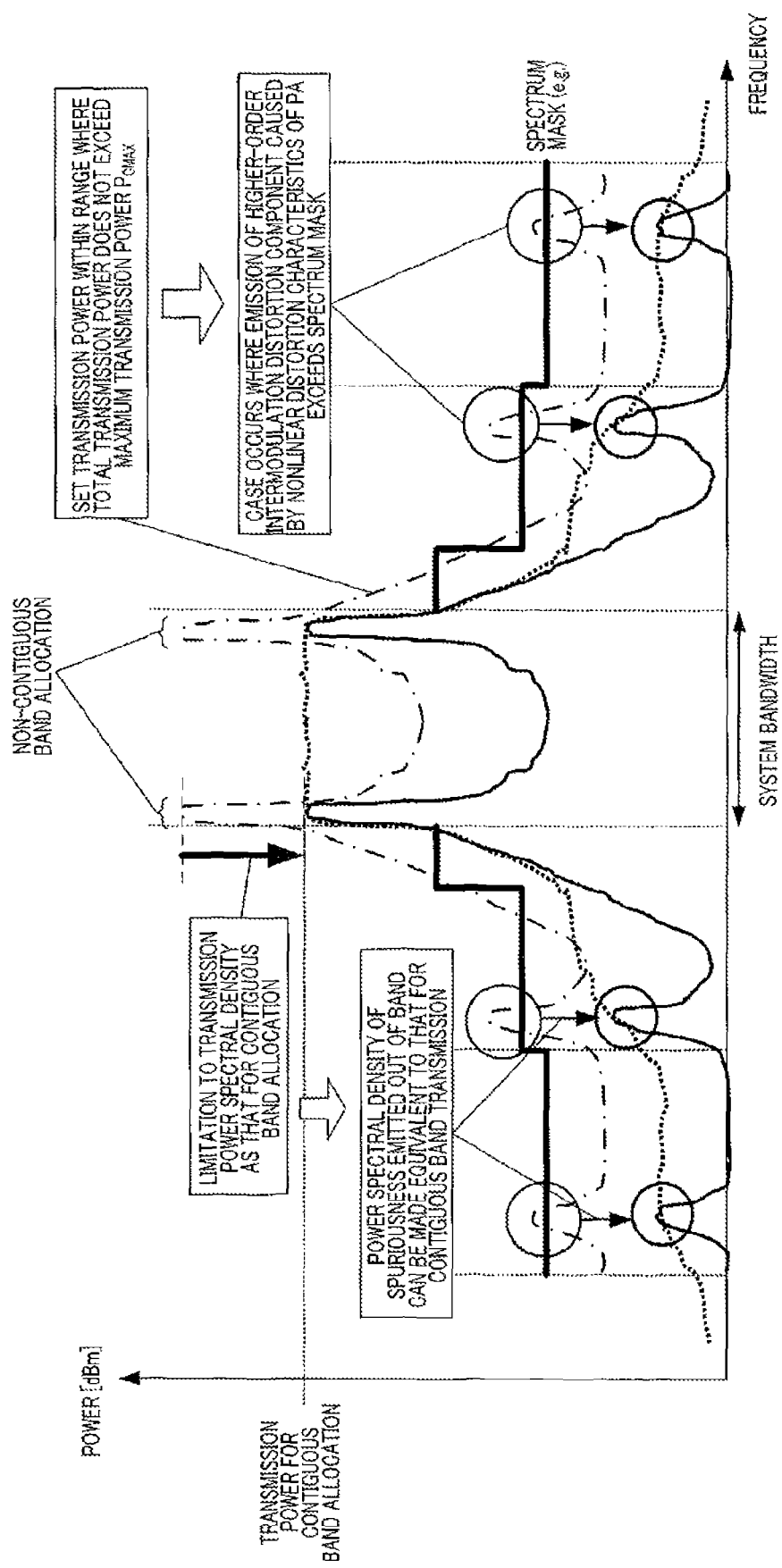
FIG. 7 is a diagram showing a relationship between transmission power and frequency in a multicarrier transmission according to Embodiment 1 of the present invention.

In FIG. 7, the horizontal axis indicates frequency [Hz], and the vertical axis indicates emission power [dBm]. The frequency bands other than the system band shown in FIG. 7 are generally used by other services and systems. The spectrum mask shown in FIG. 7 is, for instance, a spectrum mask typified by SEM (Spurious Emission Mask) set in Rel. 8 LTE.

Here, the case of allocating non-contiguous frequency bands around both the ends of the system band shown in FIG. 7 to transmission apparatus 100 (the case of non-contiguous band allocation) will be described. For instance, transmission apparatus 100 allocates two clusters generated by dividing the transmission data (contiguous band) to the vicinity of the ends of the system band shown in FIG. 7 (band allocated to transmission apparatus 100).

Alternate long and short dashed lines shown in FIG. 7 indicate the relationship between transmission power in the system band and emission power out of the system band, and frequency in the transmission power control method (the transmission power control method set by assuming contiguous band allocation transmission) of Rel. 8 LTE for non-contiguous band allocation transmission (i.e., multicarrier transmission). This transmission power control method compares maximum transmission power value $P_{CMAX}$ in consideration of the MPR value and the A-MPR value, with the total transmission power. In other words, the transmission apparatus can amplify the transmission power of a transmission signal within a range in which the total transmission power does not exceed maximum transmission power value $P_{CMAX}$. That is, according to this transmission power control method, the total, transmission power is restricted. As a result, in FIG. 7, as indicated by alternate long and short dashed lines, when the total of the frequency bandwidths occupied by the transmission signals to be subjected to non-contiguous band allocation transmission is narrower than the system bandwidth, and when the transmission signals are allocated to frequency bandwidths closer to both the ends of the system band, the power value of a higher-order inter-modulation distortion (IMD) component (that is, spuriousness) caused by non-linear distortion characteristics of PA sometimes exceeds the spectrum mask set out of the system band.

In contrast, in this embodiment, transmission apparatus 100 does not restrict the total transmission power. Instead, this transmission apparatus restricts the transmission power per unit frequency [Hz], that is, the transmission power spectral density [dBm/Hz].

More specifically, as described above, transmission apparatus 100 (contiguous band transmission power calculation section 210) calculates transmission power $P_C(i)$ (equation 2) with an assumption that the contiguous frequency band (transmission bandwidth $M_C(i)$ represented in equation 3) ranging from the lowest frequency (i.e., RB) in the cluster allocated to the lowest frequency band to the highest frequency (i.e., RB) in the cluster allocated to the highest frequency band in the transmission data (a plurality of clusters) to be transmitted by transmission apparatus 100, is allocated to transmission apparatus 100. Transmission apparatus 100 (comparison section 211) then compares transmission power $P_C(i)$ calculated by assuming contiguous band allocation transmission with maximum transmission power value $P_{CMAX}$, and specifies transmission power value $P'_C(i)$.

Transmission apparatus 100 thus acquires transmission power $P'_C(i)$ for contiguous band allocation transmission in the contiguous frequency bands including the non-contiguous bands allocated to transmission apparatus 100. That is, transmission apparatus 100 can acquire a transmission power that does not cause spuriousness exceeding the allowable range of the transmission power defined by the spectrum mask or the like set for contiguous band allocation transmission (i.e., Rel. 8 LTE).

For instance, the dotted line shown in FIG. 7 indicates the relationship between transmission power $P'_C(i)$ and frequency; where transmission power $P'C(i)$ is the power with an assumption that the contiguous frequency band (transmission bandwidth $M_C(i)$) ranging from the lowest frequency (RB) to the highest frequency (RB) in the frequency band allocated to transmission apparatus 100. As indicated by the dotted line in FIG. 7, the emission power out of the system band does not exceed the spectrum mask (allowable range).

Transmission apparatus 100 (transmission power resetting section 212) sets transmission power $P_{PUSCH}(i)$ for multicarrier transmission (non-contiguous band allocation transmission) such that the transmission power spectral density for the multicarrier transmission (non-contiguous band allocation transmission) is equivalent to the transmission power spectral density for single-carrier transmission (contiguous band allocation transmission) according to equation 6. More specifically, as shown in FIG. 7, transmission apparatus 100 adjusts transmission power $P_{PUSCH}(i)$ (solid line) for non-contiguous band allocation transmission so that the transmission power spectral density of the non-contiguous band allocation transmission can be equivalent to the transmission power spectral density for contiguous band allocation transmission (dotted line) in the system band. That is, transmission apparatus 100 calculates transmission power $P_{PUSCH}(i)$ (the solid line shown in FIG. 7) for the frequency band (the number of allocated RBs) actually allocated to transmission apparatus 100 on the transmission power $P'_C(i)$ (the dotted line shown in FIG. 7) for contiguous band allocation transmission in the system band.

Thus, in transmission apparatus 100, in the system band, the transmission power spectral, density of the transmission signal to be subjected to non-contiguous band allocation transmission can be equivalent to the transmission power spectral density for the contiguous band allocation transmission. Accordingly, as shown in FIG. 7, the power spectral density of spuriousness (solid line) emitted in the frequency band other than the system band can also be equivalent to (or lower than) the power spectral density of spuriousness (dotted line) for contiguous band allocation transmission.

Thus, in transmission apparatus 100, a transmission power is set that does not exceed the spectrum mask defined for contiguous band allocation transmission even for non-contiguous band allocation transmission, in other words, transmission apparatus 100 can use (reuse) the setting of the transmission power control for contiguous band allocation transmission (e.g., settings, such as the MPR value and A-MPR value of Rel. 8 LTE) even in the case of non-contiguous band allocation without any change. Therefore, in transmission apparatus 100, there is no need to add a new parameter (e.g., a parameter set for each non-contiguous frequency bandwidth or frequency interval of the clusters) in comparison with Rel. 8 LTE for controlling the transmission power, even in the case of non-contiguous band allocation transmission.

In transmission apparatus 100, for non-contiguous band allocation transmission, the narrower the frequency intervals of bands allocated to transmission apparatus 100 (frequency intervals between a plurality of clusters) is, (i.e., the more similar to the state of contiguous band allocation transmission the state is), the higher the transmission power per unit frequency (transmission power spectral density) can become. Accordingly, transmission apparatus 100 can increase the transmission power by controlling the transmission power according to bands allocated to transmission apparatus 100 during non-contiguous band allocation transmission (i.e., can further reduce the effective MPR value (A-MPR value)). That is, for instance, in comparison with the method of setting a few (one or two) MPR values (A-MPR values) in the case of the worst frequency situations with respect to the total transmission power, this embodiment can maintain the coverage and gain of a signal subjected to non-contiguous band allocation transmission by transmission apparatus 100 to be substantially identical to those in contiguous band allocation transmission.

Accordingly, this embodiment is capable of reusing the transmission power control method in Rel. 8 LTE for contiguous band allocation transmission without adding a new parameter for controlling the transmission power, even when the transmission apparatus performs non-contiguous band allocation transmission. Furthermore, this embodiment is capable of maintaining the coverage and gain substantially identical to those in the case for contiguous band allocation transmission, even when the transmission apparatus performs non-contiguous band allocation transmission.

In this embodiment, RB is used as a frequency allocation unit to the transmission apparatus. However, the frequency allocation unit is not limited to RB. Instead, frequency [Hz] may be used. More specifically, instead of equation 3 used in this embodiment, following equation 7 may be used. In this case, instead of equation 6 used in this embodiment, following equation 8 is used to calculate transmission power $P_{PUSCH}$ for the transmission data.

[7]

$$M_C(i) = (f_{high} - f_{low})/B_{RB}[RB]$$ (Equation 7)

[8]

$$P_{PUSCH}(i) = P'_C(i) + 10\log_{10}\left(\frac{M_{PUSCH}(i)}{f_{high} - f_{low}}\right)[dBm]$$ (Equation 8)

In equation 7, $f_{low}$ [Hz] represents the lowest frequency in the frequency band allocated to the transmission apparatus, $f_{high}$ [Hz] represents the highest frequency in the frequency band allocated to the transmission apparatus, and $B_{RB}$ [Hz] represents the frequency bandwidth [Hz] per RB. $M_{PUSCH}(i)$ represented in equation 8 is different from $M_{PUSCH}(i)$ [RB] represented in equation 6, and defined as the total value of the frequency bandwidths [Hz] occupied by the transmission signal allocated to the transmission apparatus.

Figure 8:
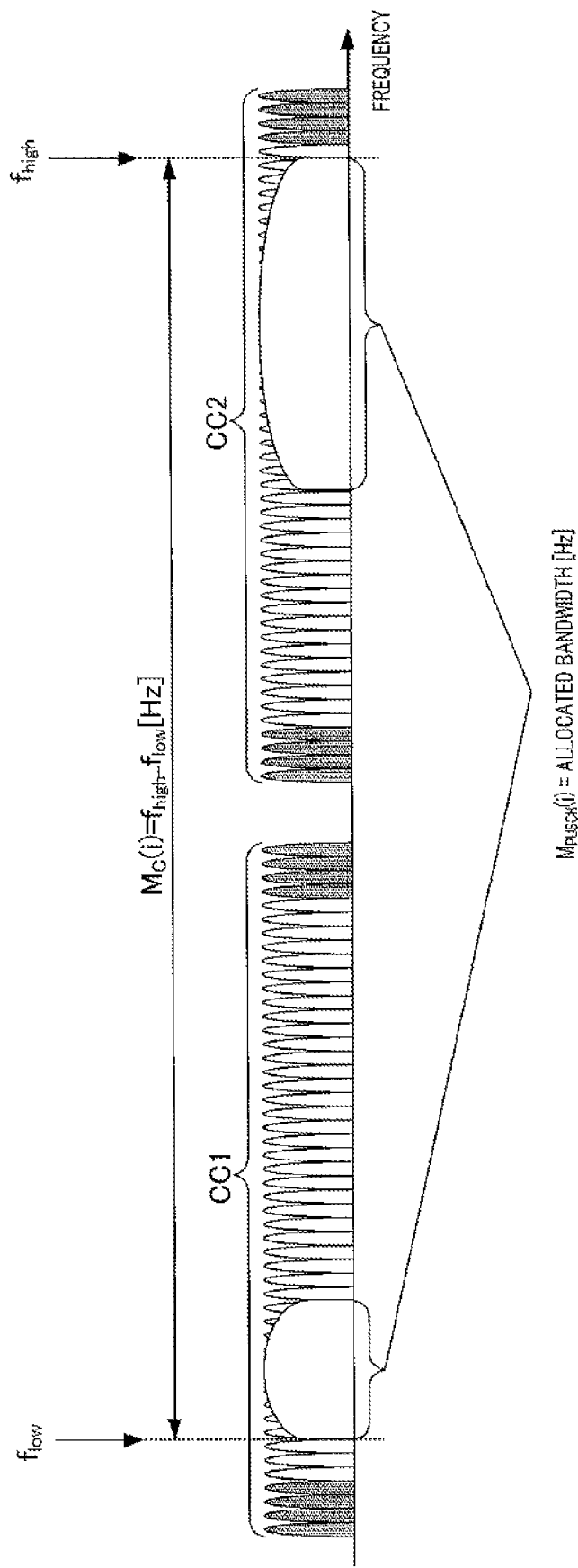
FIG. 8 is a diagram showing another process of controlling a transmission power according to Embodiment 1 of the present invention.

For instance, as shown in FIG. 8, the case of transmitting a transmission signal using one PA and a plurality of component carriers (CCs; two CCs (CC1 and CC2) in FIG. 8) (carrier aggregation; e.g., N×DFT-s-OFDM transmission or N×SC-FDMA transmission) will be described. In FIG. 8, the transmission apparatus specifies lowest frequency $fl_{ow}$ [Hz] in the frequency band to which the transmission signal is allocated (where the lowest frequency in the band allocated in CC1) and highest frequency $f_{high}$ [Hz] in the frequency band to which the transmission signal is allocated (where the highest frequency in the band allocated in CC2), and calculates transmission bandwidth $M_C(i)$ [Hz] for contiguous band allocation transmission. Then, according to this embodiment, the transmission apparatus sets transmission power value $P_{PUSCH}(i)$ [dBm], using transmission bandwidth $M_C(i)$ [Hz] according to equations 2, 4 and 8.

In this embodiment, the case where the transmission apparatus transmits PUSCH has been described. However, the present invention is also applicable to the case where the transmission apparatus transmits PUCCH. More specifically, in the case of only transmitting PUCCH, transmission apparatus 100 (FIG. 2) calculates transmission power value $P_C(i)$ [dBm] according to following equation 9 instead of equation 2.

[9]

$$P_C(i) = 10\log_{10}(M_C(i)) + P_{O\_PUCCH} + \beta \cdot PL + h + \Delta_F + g(i)$$ [dBm] (Equation 9)

In equation 9, $P_{O\_PUCCH}$ represents a received target power value for PUCCH, β represents a coefficient by which the propagation loss (PL) value is multiplied, PL represents a propagation loss value measured by propagation loss measurement section 109 (FIG. 2), h and $\Delta_F$ represent offset values corresponding to the transmission format of PUCCH, and g(i) represents the cumulative value of transmission power values (control value of closed-TPC) for PUCCH input from CRC section 108 (FIG. 2).

In equation 9, $M_C(i)$ represents the transmission bandwidth (the unit is RB) for PUCCH in the i-th subframe. Note that the contiguous band transmission power calculation section 210 (FIG. 3) sets the transmission bandwidth $M_C(i)$ according to whether the band allocated to transmission apparatus 100 that is represented in the band allocation information input from CRC section 108 (FIG. 2) is contiguous or non-contiguous. More specifically, when bands allocated to transmission apparatus 100 are contiguous, contiguous band transmission power calculation section 210 sets the number of RBs to which PUCCH is allocated, without any change, as transmission bandwidth $M_C(i)$. Meanwhile, in the case where bands allocated to transmission apparatus 100 are non-contiguous, contiguous band transmission power calculation section 210 sets transmission bandwidth $M_C(i)$ [RB] using the RB index $n_{low}^{RB}$ of RB corresponding to the lowest frequency in the cluster allocated to the lowest frequency in the contiguous bands (clusters) to which PUCCH is allocated and the RB index $n_{high}^{RB}$ of RB corresponding to the highest frequency in the cluster allocated to the highest frequency among clusters to which PUCCH is allocated, according to following equation 10.

[10]
$$M_C(i) = n_{high}^{RB} - n_{low}^{RB} + 1 \, [RB] \quad \text{(Equation 10)}$$

Next, comparison section 211 (FIG. 3) compares transmission power $P_C(i)$ input from contiguous band transmission power calculation section 210 with maximum transmission power value $P_{CMAX}$ input from the upper layer, using following equation 11. As a result of the comparison, one of transmission power $P_C(i)$ and maximum transmission power value $P_{CMAX}$ that has been determined as a lower value is output as transmission power value $P'_C(i)$ to transmission power resetting section 212 (FIG. 3). Maximum transmission power value $P_{CMAX}$ is the maximum transmission power value including the MPR value and A-MPR value set depending on a frequency band position around the system band and the like.

[11]
$$P'_C(i) = \min\{P_{CMAX}, P_C(i)\} \, [\text{dBm}] \quad \text{(Equation 11)}$$

Next, transmission power resetting section 212 (FIG. 3) sets a transmission power value for PUCCH on the basis of band allocation information input from CRC section 108. More specifically, when the band allocated to transmission apparatus 100 that is indicated by the band allocation information as being contiguous, transmission power resetting section 212 sets transmission power value $P'_C(i)$ input from comparison section 211 as transmission power value $P_{PUCCH}(i)$ for PUCCH, as shown in equation 12.

[12]
$$P_{PUCCH}(i) = P'_C(i) \, [\text{dBm}] \quad \text{(Equation 12)}$$

Meanwhile, when bands allocated to transmission apparatus 100 indicated in the band allocation information are non-contiguous, transmission power resetting section 212 sets transmission power value $P_{PUCCH}(i)$ for the transmission data, using the number of RBs $M_{PUCCH}(i)$ actually allocated to transmission apparatus 100, as shown in equation 13.

[13]
$$P_{PUCCH}(i) = P'_C(i) + 10\log_{10}\left(\frac{M_{PUCCH}(i)}{M_C(i)}\right) [\text{dBm}] \quad \text{(Equation 13)}$$

In this embodiment, the example has been described where transmission power value $P_{PUSCH}(i)$ is set according to equations 2, 4 and 6 in the case of multicarrier transmission (non-contiguous band allocation transmission). Here, transmission power value $P_{PUSCH}(i)$ may be set as in equivalent equation 14, to which $M_C(i)$ defined by equation 3 and the number of actually allocated RBs $M_{PUSCH}(i)$ are applied.

[14]
$$P_{PUSCH}(i) = \min\{P_{CMAX} - 10\log_{10}(M_C(i)), 10\log_{10}(M_{PUSCH}(i)) + P_{O\_PUSCH}(j) + \alpha(j) \cdot PL + \Delta_{TF}(i) + f(i)\} \, [\text{dBm}] \quad \text{(Equation 14)}$$

(Embodiment 2)

In this embodiment, the case where a transmission apparatus frequency-multiplexes first transmission data and second transmission data and simultaneously transmits the data will be described.

In the following description, first transmission data (transmission data 1) is user data (PUSCH) and second transmission data (transmission data 2) is control information (PUCCH). However, transmission data 1 and transmission data 2 are not limited to PUSCH and PUCCH. Transmission data 1 and transmission data 2 may be any of the user data (PUSCH) and the control information (PUCCH).

In the following description, the transmission apparatus separately controls the transmission power of transmission data 1 and the transmission power of transmission data 2.

Figure 9:
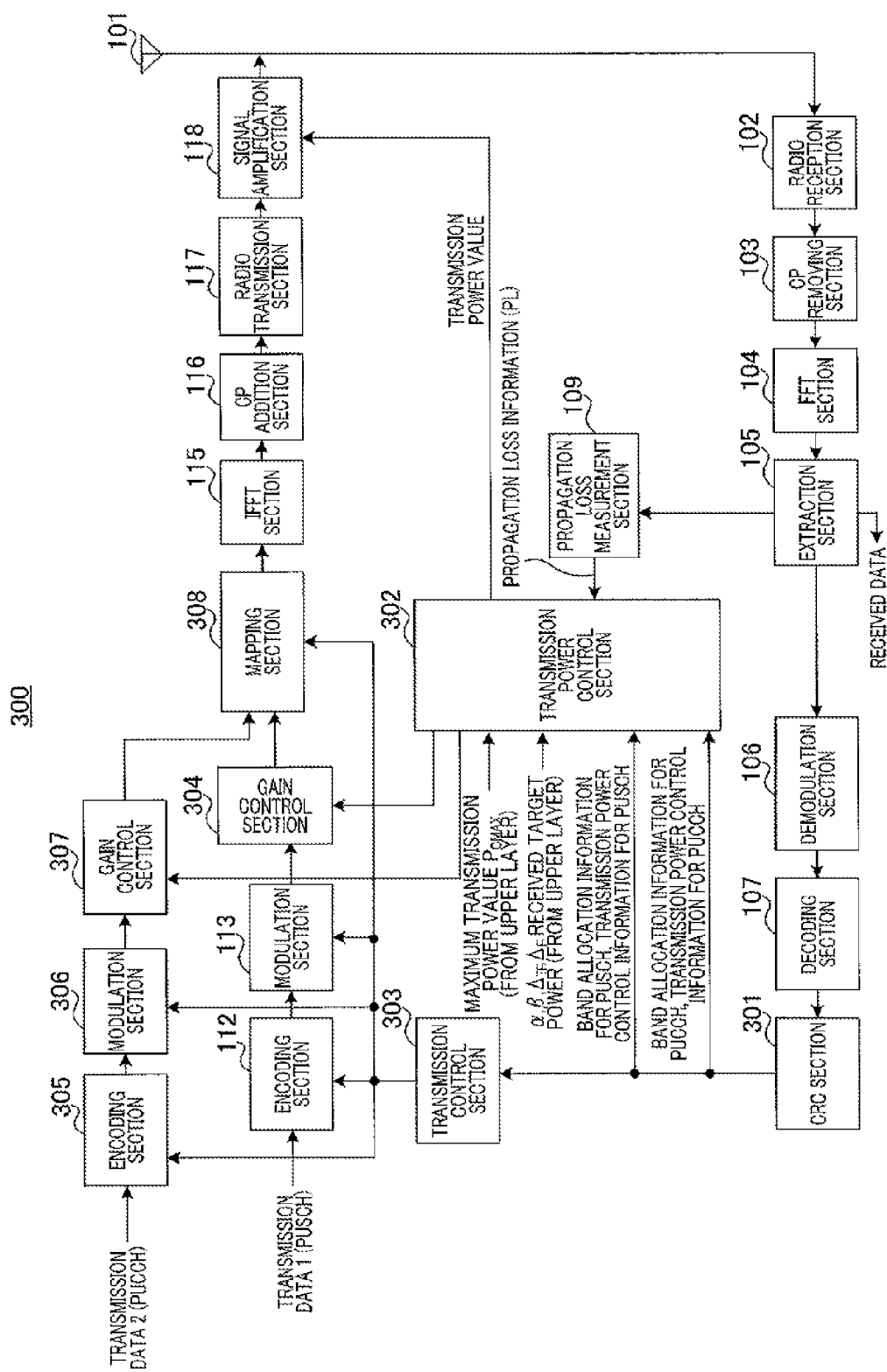
FIG. 9 is a block diagram showing a configuration of a transmission apparatus according to Embodiment 2 of the present invention.

FIG. 9 shows the configuration of transmission apparatus 300 (UE) according to this embodiment. In FIG. 9, the identical reference signs are assigned to identical configuration elements to those of Embodiment 1 (FIG. 2), and the description thereof is omitted.

Transmission apparatus 300 shown in FIG. 9 can frequency-multiplex transmission data 1 (PUSCH) and transmission data 2 (PUCCH) and simultaneously transmit the data, and separately set band allocation and transmission power control to each portion of the transmission data.

In transmission apparatus 300 shown in FIG. 9, CRC section 301 determines each portion of the control information input from decoding section 107, as with CRC section 108 in Embodiment 1. Note that the control information includes not only the band allocation information and transmission power control information for PUSCH (transmission data 1) similar to those in Embodiment 1 but also band allocation information and transmission power control information for PUCCH (transmission data 2). When determining that the control information has been correctly received, CRC section 301 outputs individual control information for corresponding transmission data to transmission power control section 302 and transmission control section 303.

Transmission power control section 302 determines the transmission powers of transmission data 1 and transmission data 2 to be transmitted on the basis of the band allocation information, using the control information (band allocation information and transmission power control information) for PUSCH (transmission data 1) and the control information (band allocation information and transmission power control information) for PUCCH (transmission data 2) that are received as input from CRC section 301, the control information preliminarily input from the upper layer (not shown) (i.e., parameters, such as maximum transmission power value $P_{CMAX}$, the received target power, coefficients $\alpha$ and $\beta$ by which the propagation loss is multiplied, offset value $\Delta_{TF}$ corresponding to the transmission data type or the modulation scheme (QPSK, 16QAM, etc.) type, and offset value $\Delta_F$ corresponding to the transmission format of PUCCH), and propagation loss information (PL) input from propagation loss measurement section 109. Transmission power control section 302 controls signal amplification section 118 such that the transmission powers of transmission data 1 and transmission data 2 become the determined transmission power values, by inputting the determined transmission power values into signal amplification section 118.

When each portion of the band allocation information indicates that transmission data 1 (PUSCH) and transmission data 2 (PUCCH) are simultaneously transmitted, transmission power control section 302 determines whether transmission data 1 (PUSCH) and transmission data 2 (PUCCH) can be simultaneously transmitted or not. Transmission power control section 302 controls the transmission power gain ratios of transmission data 1 and transmission data 2 for gain control sections 304 and 307. Details of the process of controlling the transmission power in transmission power control section 302 will be described later.

Transmission control section 303 controls transmission of transmission data 1 and transmission data 2 on the basis of the band allocation information notified from reception apparatus (eNB). More specifically, transmission control section 303 outputs the code rate, the modulation scheme, and physical resource position information to encoding section 112, modulation section 113, and mapping section 308, respectively, on the basis of the allocated radio resource and transmission parameters, which are indicated by the band allocation information for transmission data 1 (PUSCH) input from CRC section 301. Likewise, transmission control section 303 outputs the code rate, the modulation scheme, and physical resource position information to encoding section 305, modulation section 306, and mapping section 308 on the basis of the allocated radio resource and transmission parameters as indicated by the band allocation information for transmission data 2 (PUCCH) input from CRC section 301.

Gain control section 304 performs gain control on transmission data 1 (PUSCH) input from modulation section 113, according to the control by transmission power control section 302. Gain control section 304 then outputs gain-controlled transmission data 1 (PUSCH) to mapping section 308.

As with encoding section 112, encoding section 305 encodes transmission data 2 (PUCCH) according to the code rate input from transmission control section 303, and outputs encoded transmission data 2 to modulation section 306. As with modulation section 113, modulation section 306 modulates transmission data 2 (encoded bit string) input from encoding section 305, according to the modulation scheme input from transmission control section 303, and outputs the modulated transmission data to gain control section 307.

As with gain control, section 304, gain control section 307 performs gain control on transmission data 2 (PUCCH) input from modulation section 306, according to the control by transmission power control section 302. Gain control section 307 then outputs gain-controlled transmission data 2 (PUCCH) to mapping section 308.

Mapping section 308 maps transmission data 1 (PUSCH) input from gain control section 304 and transmission data 2 (PUCCH) input from gain control section 307 onto the physical resources indicated by the physical resource position information input from transmission control section 303, and outputs signals having a plurality of subcarriers corresponding to the physical resources onto which transmission data 1 (PUSCH) and transmission data 2 (PUCCH) are mapped to IFFT section 115.

The details of the process of controlling the transmission power in transmission power control section 302 of transmission apparatus 300 will now be described. Hereinafter, the first data is referred to as user data (PUSCH), and the second data is referred to as control information (PUCCH).

Figure 10:
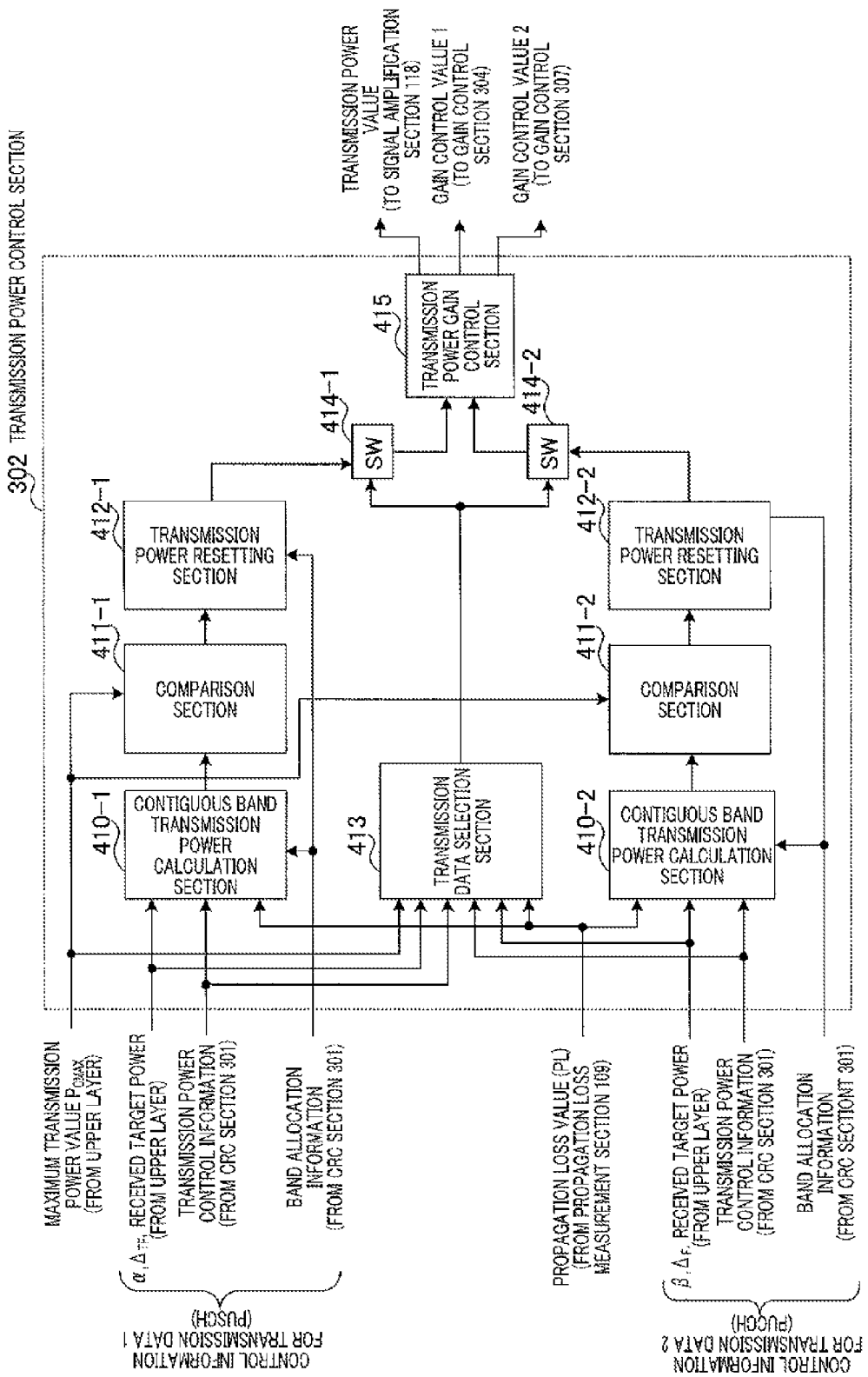
FIG. 10 is a block diagram showing an internal configuration of a transmission power control section according to Embodiment 2 of the present invention.

FIG. 10 shows the internal configuration of transmission power control section 302. Transmission power control section 302 shown in FIG. 10 includes contiguous band transmission power calculation, sections 410-1 and 410-2, comparison sections 411-1 and 411-2, transmission power resetting sections 412-1 and 412-2, and switches (SW) 414-1 and 414-2, which are provided for PUSCH and PUCCH, respectively.

Contiguous band transmission power calculation sections 410-1 and 410-2, comparison sections 411-1 and 411-2, and transmission power resetting sections 412-1 and 412-2 of transmission power control section 302 shown in FIG. 10 perform processes similar to those performed by contiguous band transmission power calculation section 210, comparison section 211 and transmission power resetting section 212 in Embodiment 1 (FIG. 3), on PUSCH or PUCCH.

In the case where only any one of PUSCH and PUCCH is transmitted, transmission power control section 302 performs controls the transmission powers of PUSCH and PUCCH as in Embodiment 1. For instance, transmission power control section 302 sets transmission power $P_{PUSCH}(i)$, using equations 2, 4 and 5 (i.e., using equation 1) in Embodiment 1 as a transmission power control method for PUSCH. For instance, transmission power control section 302 sets transmission power $P_{PUCCH}(i)$, using equation 9 in Embodiment 1 as a transmission power control method for PUCCH. That is, transmission power control, section 302 separately controls transmission powers of PUSCH and PUCCH, using the transmission power control method for contiguous band allocation transmission in Rel. 8 LTE.

In the case where the band allocation information notified from reception apparatus (eNB) indicates that PUSCH and PUCCH are frequency-multiplexed and simultaneously transmitted, transmission power control section 302 determines whether PUSCH and PUCCH can be frequency-multiplexed and simultaneously transmitted or not. More specifically, transmission power control section 302 compares the determination parameter with the determination reference, and determines whether to simultaneously transmit PUSCH and PUCCH or to transmit only one of PUSCH and PUCCH. The determination reference is maximum transmission power value $P_{CMAX}$ set in the method of controlling the transmission powers of PUSCH and PUCCH (transmission power control method in Rel. 8 LTE). The determination parameter is transmission power $P_C(i)$ to be described later.

Figure 11:
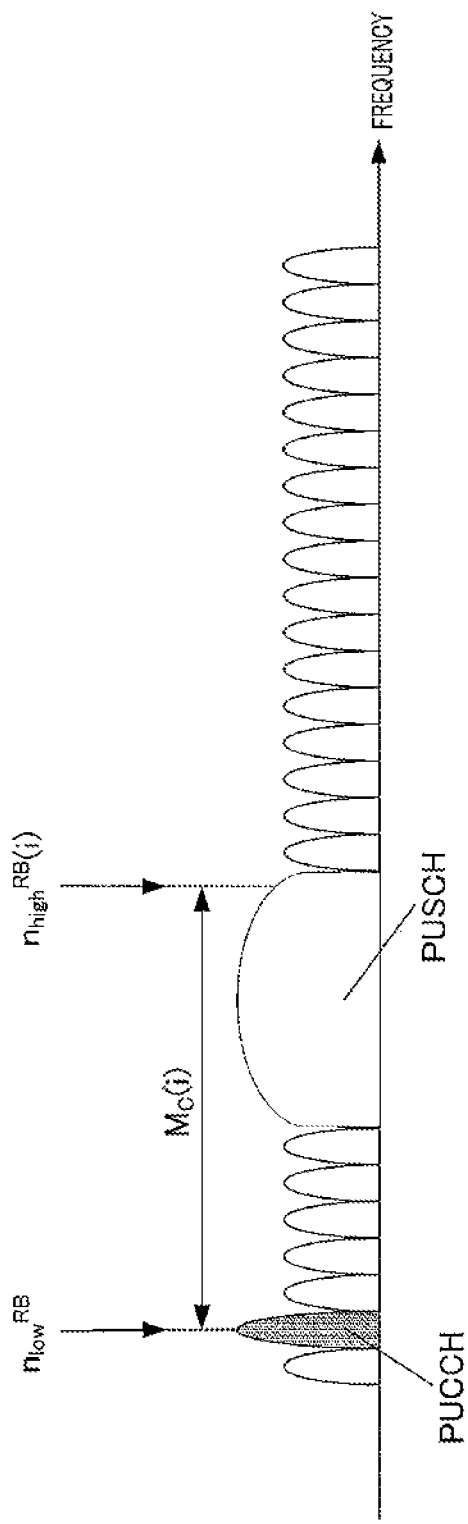
FIG. 11 is a diagram showing a process of controlling a transmission power according to Embodiment 2 of the present invention.

More specifically, in FIG. 11, transmission data selection section 413 compares transmission powers per unit frequency (1 RB) (i.e., transmission power spectral densities) between PUSCH and PUCCH on the basis of control information for PUSCH, control information for PUCCH, maximum transmission power value $P_{CMAX}$, and propagation loss value (PL). Transmission data selection section 413 sets the transmission power spectral density of transmission, data having a higher transmission power spectral density between PUSCH and PUCCH as a reference power spectral density according to following equation 15, and calculates transmission power $P_C(i)$ for the i-th subframe with an assumption that the band allocated to transmission apparatus 300 including both PUSCH and PUCCH is a contiguous band.

[15]

$$P_C(i) = 10\log_{10}(M_C(i)) + \max\{P_{PUSCH\_1RB}(i), P_{PUCCH\_1RB}(i)\} \quad \text{(Equation 15)}$$

In equation 15, $M_C(i)$ is a transmission bandwidth (where the unit is RB) of the i-th subframe to be used when the frequency band is assumed to be a contiguous band, the frequency band ranging from the lowest frequency in the transmission data allocated to the lowest frequency band among the frequency bands (allocated bands) allocated to PUSCH and PUCCH to the highest frequency in the transmission data allocated to the highest frequency band among the frequency bands allocated to PUSCH and PUCCH. For instance, as shown in FIG. 11, transmission data selection section 413 sets transmission bandwidth $M_C(i)$ [RB], according to equation 3 or 7 in Embodiment 1, using RB index $n_{low}^{RB}$ of the lowest frequency (RB) in PUCCH allocated to the lowest frequency band among the bands allocated to PUSCH and PUCCH, and RB index $n_{high}^{RB}$ of the highest frequency in PUSCH allocated to the highest frequency band among bands allocated to PUSCH and PUCCH.

In equation 15, PUSCH transmission power per unit frequency (1 RB) (transmission power spectral density) $P_{PUSCH\_1RB}(i)$ and PUCCH transmission power per section frequency (1 RB) (transmission power spectral density) $P_{PUCCH\_1RB}(i)$ are calculated according to following equations 16 and 17.

[16]
$$P_{PUSCH\_1RB}(i)=P_{O\_PUSCH}+\alpha \cdot PL+\Delta_{TF}(i)+f(i) \quad \text{(Equation 16)}$$

[17]
$$P_{PUCCH\_1RB}(i)=P_{O\_PUCCH}+PL+h+\Delta_F(i)+g(i) \quad \text{(Equation 17)}$$

Note that the parameters of equations 16 and 17 are identical to those of equations 2 and 9 in Embodiment 1.

More specifically, transmission power $P_C(i)$, which is the determination parameter in transmission power control section 302, is a power value calculated as a product of the higher transmission power spectral density between transmission power spectral density $P_{PUSCH\_1RB}(i)$ of PUSCH and transmission power spectral density $P_{PUCCH\_1RB}(i)$ of PUCCH, and frequency bandwidth. $M_C(i)$ of the frequency band ranging from the lowest frequency in the transmission data allocated to the lowest frequency band between PUSCH and PUCCH (RB index $n_{low}^{RB}$) to the highest frequency in the transmission data allocated to the highest frequency band between PUSCH and PUCCH (RB index $n_{high}^{RB}$).

Note that, here, the case where the RB indexes are continuously assigned in an ascending order from the lower frequency has been described as with Embodiment 1. In essence, transmission data selection section 413 calculates the transmission power by assuming that a contiguous frequency band (frequency band ranging from the lowest frequency RB to the highest frequency RB) including the lowest frequency RB to the highest frequency RB among bands allocated to transmission data 1 and transmission data 2.

Figure 12A:
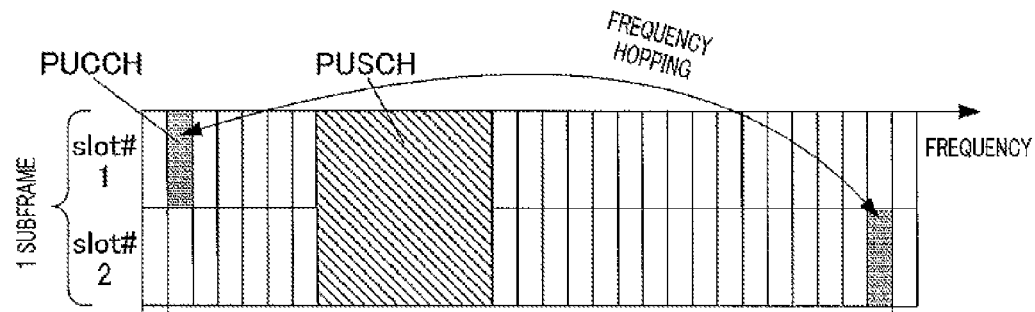
FIG. 12 is a diagram showing a process of controlling a transmission power according to Embodiment 2 of the present invention (in frequency hopping)
Figure 12B:
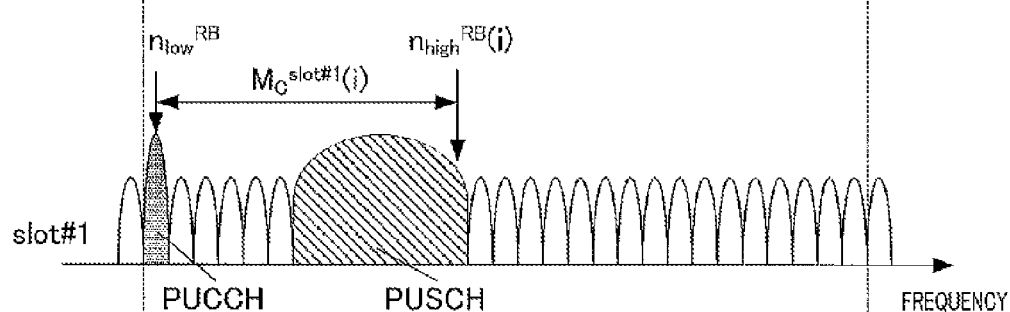
Figure 12C:
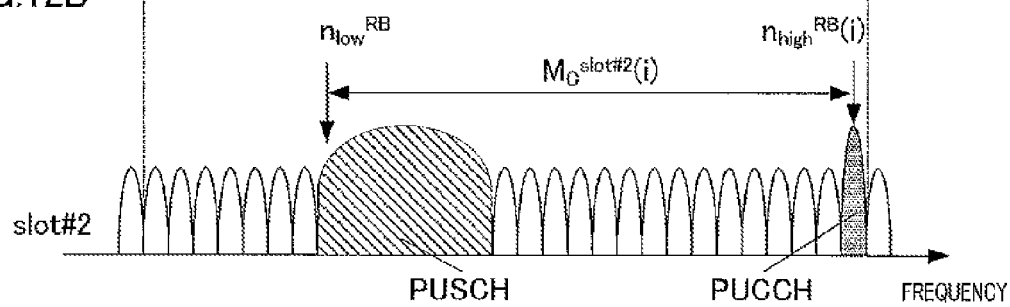

According to the 3GPP E-UTRA system disclosed in NPL 2, as shown in FIG. 12A, as to PUCCH, the transmission RB position hops in frequency between the first half (slot#1) and latter half (slot#2) of one subframe. Thus, in the case where PUCCH, PUSCH, or both PUSCH and PUCCH hop in frequency, transmission data selection section 413 applies a wider transmission bandwidth between transmission bandwidth $M_C^{slot\#1}(i)$ in slot#1 shown in FIG. 12B and transmission bandwidth $M_C^{slot\#2}(i)$ in slot#2 shown in FIG. 12C, as transmission bandwidth $M_C(i)$ used for calculating transmission power $P_C(i)$ shown in equation 15, according to following equation 18. That is, in the case where PUSCH or PUCCH hops in frequency between slots in one subframe, transmission power $P_C(i)$ as the determination parameter is the power value calculated using the widest bandwidth among a plurality of transmission bandwidths ($M_C^{slot\#1}(i)$ and $M_C^{slot\#1}$ in FIGS. 12B and 12C) calculated for the respective slots in one subframe.

[18]
$$M_C(i)=\max\{M_C^{slot\#1}(i),M_C^{slot\#2}(i)\} \quad \text{(Equation 18)}$$

Next, transmission data selection section 413 compares transmission power $P_C(i)$ calculated using equation 15 with maximum transmission power value $P_{CMAX}$ input from the upper layer. Transmission data selection section 413 then determines whether to simultaneously transmit PUSCH and PUCCH or not (i.e., selects transmission data to be transmitted), on the basis of the result of comparison. Maximum transmission power value $P_{CMAX}$ is the maximum transmission power value including the MPR value and A-MPR value set depending on a frequency band position of the system band.

More specifically, transmission data selection section 413 determines to transmit only any one of PUSCH and PUCCH and drop the other in the case where transmission power $P_C(i)$ is higher than maximum transmission power value $P_{CMAX}$ ($P_{CMAX}<P_C(i)$). Transmission data selection section 413 then instructs SW 414 between SWs 414-1 and 414-2, which corresponds to transmission data to be transmitted, to output the transmission power value input from transmission power resetting section 412 corresponding to transmission data to be transmitted to transmission power gain control section 415. Meanwhile, transmission data selection section 413 instructs SW 414 between SWs 41.4-1 and 414-2, which corresponds to transmission data not to be transmitted, to set the transmission power value input from transmission power resetting section 412 corresponding to transmission data not to be transmitted to zero.

In general, PUCCH includes more important information than retransmittable PUSCH. The information includes channel quality information, a response signal of hybrid ARQ (automatic repeat request) and the like. Accordingly, it is preferred that transmission data selection section 413 determine to transmit PUCCH and drop PUSCH in the case where transmission power $P_C(i)$ is higher than maximum transmission power value $P_{CMAX}$ ($P_{CMAX}<P_C(i)$).

Meanwhile, in the case where transmission power $P_C(i)$ is equal to or less than maximum transmission power value $P_{CMAX}$ ($P_{CMAX}\geq P_C(i)$), transmission data selection section 413 determines that PUSCH and PUCCH are simultaneously transmitted. Transmission data selection section 413 then instructs both SWs 414-1 and 414-2 to output the transmission power values input from respective transmission power resetting sections 412-1 and 412-2, which correspond to respective portions of the transmission data, to transmission power gain control section 415.

SWs 414-1 and 414-2 switch on/off of the transmission power values input from transmission power resetting sections 412-1 and 412-2 (on: outputting transmission power value without any change; off: setting transmission power value to zero and output the value) according to the instruction from transmission data selection section 413.

Next, when only transmission data of any one of PUSCH and PUCCH is input, transmission power gain control section 415 simply outputs the transmission power value that corresponds to the transmission data and input from transmission power resetting section 412 via SW 414 to signal amplification section 118. Here, transmission power gain control section 415 sets each of gain control value 1 for PUSCH and gain control value 2 for PUCCH to one, and outputs the value to gain control sections 304 and 307. This means that gain control sections 304 and 307 do not perform gain control on the transmission data.

Meanwhile, in the case where both PUSCH and PUCCH are input (simultaneous transmission), transmission power gain control section 415 sets gain control value 1 for PUSCH and gain control value 2 for PUCCH on the basis of transmission power values ($P_{PUSCH}(i)$ and $P_{PUCCH}(i)$) input from transmission power resetting sections 412-1 and 412-2 via SWs 414-1 and 414-2.

More specifically, signal amplification section 118 (FIG. 9) assumes the amplification section circuit of one system. Accordingly, the transmission power output from signal amplification section 118 is required to be ($P_{PUSCH}(i)+P_{PUCCH}(i)$) [dBm]. That is, in transmission apparatus 300, it is required that the difference between the transmission power values per unit frequency (transmission power spectral density) of PUSCH and PUCCH be adjusted by gain control sections 304 and 307 before multiplexing of two portions of transmission data in mapping section 308.

Thus, transmission power gain control section 415 outputs ($P_{PUSCH}(i)+P_{PUCCH}(i)$) [dBm] as the transmission power value in the case of simultaneously outputting PUSCH and PUCCH, to signal amplification section 118. Transmission power gain control section 415 sets gain control value 1 for PUSCH according to equation 19, and outputs gain control value 1 to gain control section 304. Transmission power gain control section 415 sets gain control value 2 for PUCCH according to equation 20, and outputs gain control value 2 to gain control section 307.

[19]
$$\text{Gain control value } 1 = \frac{10^{P_{PUSCH}(i)/10}}{10^{P_{PUCCH}(i)/10} + 10^{P_{PUSCH}(i)/10}} \quad \text{(Equation 19)}$$

[20]
$$\text{Gain control value } 2 = \frac{10^{P_{PUCCH}(i)/10}}{10^{P_{PUCCH}(i)/10} + 10^{P_{PUSCH}(i)/10}} \quad \text{(Equation 20)}$$

The gain control method for PUSCH and PUCCH represented by equations 19 and 20 is only an example. Another gain control method may be adopted as long as the gain is controlled such that transmission power 1 (PUSCH) and transmission power 2 (PUCCH) output from signal amplification section 118 are $P_{PUSCH}(i)$ [dBm] and $P_{PUCCH}(i)$ [dBm], respectively, and the total transmission power is ($P_{PUSCH}(i)+P_{PUCCH}(i)$)) [dBm].

Figure 13:
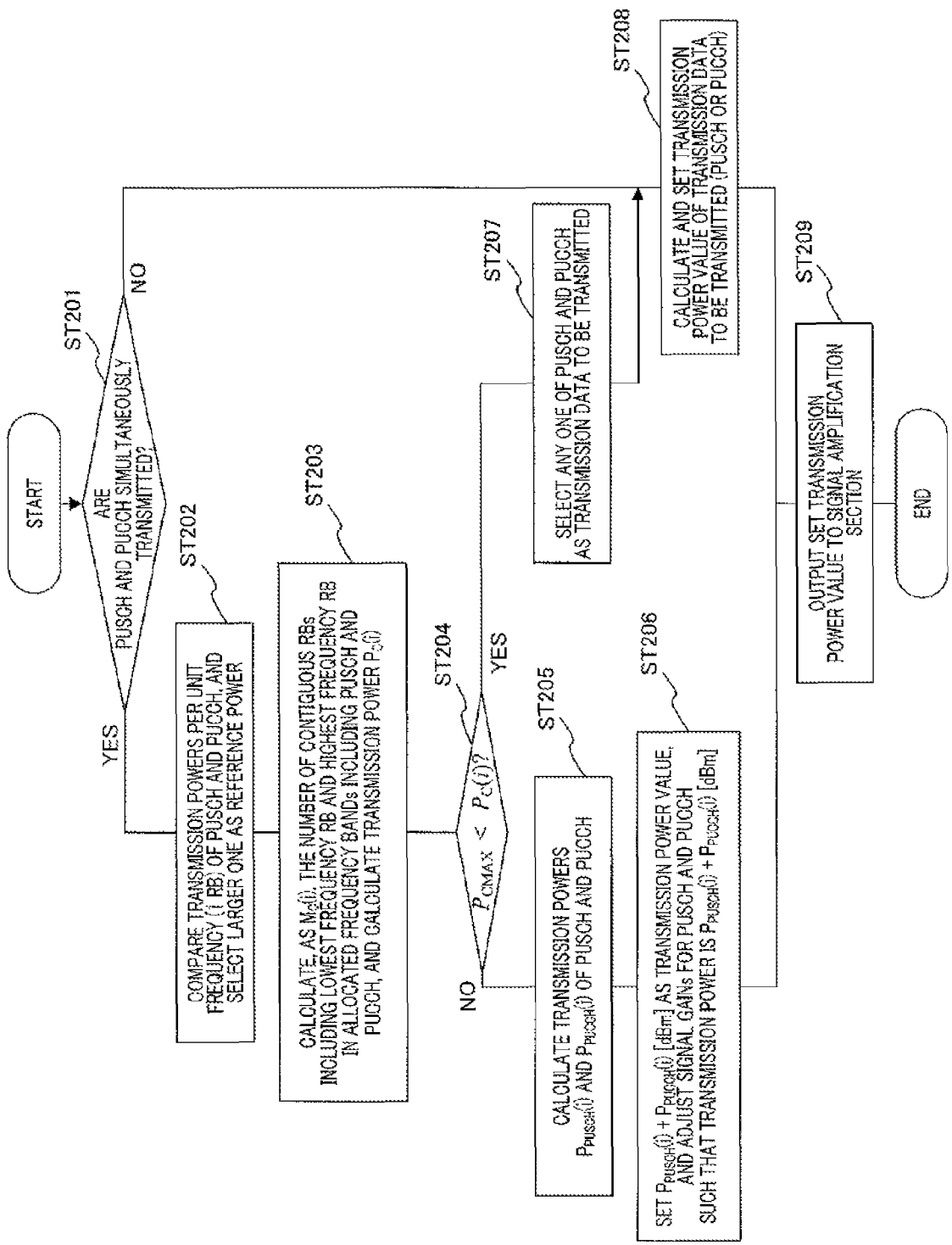
FIG. 13 is a diagram showing a flow of controlling a transmission power according to Embodiment 2 of the present invention.

Next, the process flow for controlling the transmission power in transmission power control section 302 will be described. FIG. 13 is a flowchart showing the process flow for controlling the transmission power in transmission power control section 302.

In FIG. 13, in ST201, transmission power control section 302 determines whether PUSCH and PUCCH are simultaneously transmitted in the i-th subframe or not on the basis of the band allocation information notified from reception apparatus (eNB). If PUSCH and PUCCH are simultaneously transmitted (ST201: YES), in ST202 transmission power control section 302 (transmission data selection section 413) compares the transmission power of PUSCH per unit frequency (1 RB) (transmission power spectral density; $P_{PUSCH\_1RB}(i)$ represented in equation 16) with the transmission power spectral density of PUCCH ($P_{PUCCH\_1RB}$ represented in equation 17), and selects the transmission power of the transmission data having the higher transmission power spectral density, as a reference power.

In ST203, transmission power control section 302 (i.e., transmission data selection section 413) sets, as transmission bandwidth $M_C(i)$, the number of RBs corresponding to the frequency band (contiguous frequency band) ranging from RB (e.g., $n_{low}^{RB}$ shown in FIG. 11) allocated to the lowest frequency to RB (e.g., $n_{high}^{RB}$ shown in FIG. 11 allocated to the highest frequency in all the frequency bands (allocated frequency bands) allocated to PUSCH and PUCCH. Transmission data selection section 413 then calculates transmission power value $P_C(i)$, using set transmission bandwidth $M_C(i)$ and the reference power selected in ST202, according to equation 15.

In ST204, transmission power control section 302 (i.e., transmission data selection section 413) compares maximum transmission power value $P_{MAX}$ input from the upper layer with transmission power value $P_C(i)$ calculated in ST203.

If transmission power value $P_C(i)$ is equal to or less than maximum transmission power value $P_{CMAX}$ (ST204: NO), transmission power control section 302 (i.e., contiguous band transmission power calculation section 410 to transmission power resetting section 412) calculates transmission power value $P_{PUSCH}(i)$ of PUSCH and transmission power value $P_{PUCCH}(i)$ of PUCCH in ST205 as with transmission power control section 110 in Embodiment 1. Transmission data selection section 413 determines to simultaneously transmit PUSCH and PUCCH, and instructs SWs 414-1 and 414-2 to output the transmission power values input from transmission power resetting sections 412-1 and 412-2 to transmission power gain control section 415.

In ST206, transmission power control section 302 (transmission power gain control section 415) sets $P_{PUSCH}(i)+P_{PUCCH}(i)$ [dbm] as the transmission power value in the case of simultaneously outputting PUSCH and PUCCH. Transmission power gain control section 415 adjusts gain control value 1 for PUSCH (equation 19) and gain control value 2 for PUCCH (equation 20) such that the transmission power value in the case of simultaneously transmitting PUSCH and PUCCH is $P_{PUSCH}(i)+P_{PUCCH}(i)$ [dBm].

Meanwhile, if transmission power value $P_C(i)$ calculated in ST203 is higher than maximum transmission power value $P_{CMAX}$ (ST204: YES), in ST207 transmission power control section 302 (transmission data selection section 413) selects any one of PUSCH and PUCCH. For instance, taking into consideration that PUCCH is more important than PUSCH, transmission data selection section 413 selects PUCCH as the transmission data to be transmitted.

When PUSCH and PUCCH are not simultaneously transmitted (i.e., ST201: NO) or if transmission power value $P_C(i)$ calculated in ST203 is higher than maximum transmission power value $P_{CMAX}$ (i.e., ST204: YES), that is, when only one of PUSCH and PUCCH is transmitted, transmission power control section 302 (i.e., contiguous band transmission power calculation section 410 to transmission power resetting section 412) calculates the transmission power value for transmission data to be transmitted (PUSCH or PUCCH) as with transmission power control section 110 in Embodiment 1, and sets the value as the transmission power value for transmitting the transmission data in ST208.

In ST209, transmission power control section 302 (i.e., transmission power gain control section 415) outputs the transmission power value calculated in ST206 or ST208 to signal amplification section 118.

Thus, when transmission power control section 302 independently controls the transmission powers of PUSCH and PUCCH and frequency-multiplexes and simultaneously transmits PUSCH and PUCCH, transmission power control section 302 compares transmission power $P_C(i)$ with maximum transmission power value $P_{CMAX}$, transmission power $P_C(i)$ being calculated by assuming that the frequency band ranging from the lowest frequency (RB index $n_{low}^{RB}$ in FIG. 11) to the highest frequency (RB index $n_{high}^{RB}$ in FIG. 11) in the frequency bands allocated to PUSCH and PUCCH is a contiguous frequency band.

Here, transmission power $P_C(i)$ represented by equation 15 is calculated on the basis of the transmission power of the transmission data having higher transmission power spectral density between the transmission power spectral density of PUSCH and the transmission power spectral density of PUCCH.

Furthermore, as shown in FIG. 12A, in the case where PUCCH hops in frequency between different slots (slot#1 and slot#2) in one subframe, transmission power $P_C(i)$ represented in equation 15 is calculated on the basis of the transmission bandwidth having a wider bandwidth between transmission bandwidth $M_C^{slot\#1}(i)$, which is regarded as the contiguous frequency band in slot#1, and transmission bandwidth $M_C^{slot\#2}(i)$ which is regarded as the contiguous frequency band in slot#2, as shown in equation 18.

That is, when transmission power control section 302 simultaneously transmits PUSCH and PUCCH, transmission power control section 302 compares maximum transmission power $P_C(i)$ (i.e., the transmission power set with an assumption that the transmission power spectral density is higher and transmission bandwidth is larger) to be set in the contiguous band allocation transmission in a contiguous frequency band including PUSCH and PUCCH, with maximum transmission power value $P_{CMAX}$ set in the contiguous band allocation transmission (e.g., Rel. 8 LTE).

Accordingly, there is a high possibility that the transmission power value used when transmission apparatus 300 actually and simultaneously transmits PUSCH and PUCCH is equal to transmission power $P_C(i)$, or less than transmission power $P_C(i)$.

Thus, in the case where transmission power value $P_C(i)$ is equal to or less than maximum transmission power value $P_{CMAX}$, the actual transmission power value does not exceed maximum transmission power value $P_{CMAX}$ even if transmission apparatus 300 actually and simultaneously transmits PUSCH and PUCCH. That is, in the case where transmission power value $P_C(i)$ is equal to or less than maximum transmission power value $P_{CMAX}$, the value does not exceed the spectrum mask defined for contiguous band allocation transmission even if transmission apparatus 300 actually and simultaneously transmits PUSCH and PUCCH. Thus, in the case where transmission power value $P_C(i)$ is equal to or lower than maximum transmission power value $P_{CMAX}$, transmission apparatus 300 can determine that PUSCH and PUCCH are simultaneously transmittable.

In contrast, in the case where transmission power value $P_C(i)$ is higher than maximum transmission power value $P_{CMAX}$, the actual transmission power value may exceed maximum transmission power value $P_{CMAX}$ if transmission apparatus 300 actually and simultaneously transmits PUSCH and PUCCH. That is, when transmission power value $P_C(i)$ is higher than maximum transmission power value $P_{CMAX}$, the value may exceed the spectrum mask defined for contiguous band allocation transmission, if transmission apparatus 300 simultaneously transmits PUSCH and PUCCH in actuality. Thus, in the case where transmission power value $P_C(i)$ is higher than maximum transmission power value $P_{CMAX}$, transmission apparatus 300 can determine that only one of PUSCH and PUCCH (e.g., PUCCH including more important information) can be transmitted.

Thus, according to this embodiment, when simultaneously transmitting a plurality of portions of transmission data (contiguous band allocation transmission or non-contiguous band allocation transmission), the transmission apparatus can determine whether the portions of data can be simultaneously transmitted or not irrespective of the number of portions of transmission data, the allocated frequency position, and the number of RBs per portion of transmission data, that is, without adding a new parameter. This allows the transmission apparatus to use the transmission power control in Rel. 8 LTE for contiguous band allocation transmission, without any change, even when a plurality of portions of transmission data whose transmission powers are controlled independently are frequency-multiplexed and simultaneously transmitted (contiguous band allocation transmission or non-contiguous band allocation transmission).

According to this embodiment, in the case where a plurality of portions of transmission data whose transmission powers are independently controlled are frequency-multiplexed and simultaneously transmitted, the transmission apparatus determines whether or not the power value for the contiguous frequency band including the plurality of portions of transmission data (transmission bandwidth $M_C(i)$) satisfies the specifications (the spectrum mask etc.) defined for contiguous band allocation transmission. Accordingly, even if a plurality of portions of transmission data whose transmission powers are independently controlled are frequency-multiplexed and simultaneously transmitted, it is possible to maintain the coverage and gain equivalent to those in the case of contiguous band allocation transmission of each portion of the transmission data.

The embodiments of the present invention have thus been described.

In the embodiments, the description has been made exemplifying the case of implementing the present invention using hardware. However, the present invention can be realized using software in cooperation with hardware.

The functional blocks used for describing the embodiments are typically realized as an LSI as an integrated circuit. These may be separately implemented into one chip, or integrated into one chip in a manner to include a part or all the parts thereof. Here, LSI is adopted. However, this can be referred to as an IC, system LSI, super LSI or ultra LSI, according to the degree of integration.

The method of integration into an integrated circuit is not limited to that of LSI, Instead, the integration may be realized using a dedicated circuit or a general-purpose processor. An FPGA (Field Programmable Gate Array) that is programmable after LSI production, or a reconfigurable processor, which allows reconfiguration of connection of circuit cells and setting in the LSI, may be used.

Furthermore, in the case of advent of a technique of integration into an integrated circuit that replaces LSI according to another technology advanced or derived from the semiconductor technology, the technique may be used to integrate the functional blocks as a matter of course. Application of biotechnologies is possible.

The disclosure of the specification, drawings and abstract included in Japanese Patent Application No. 2010-086989 filed Apr. 5, 2010 is incorporated herein by reference in its entirety.

INDUSTRIAL APPLICABILITY

The present invention is applicable to mobile communication systems and the like.

Reference Signs List
100, 300 transmission apparatus
101 antenna
102 radio reception section
103 CP removing section
104 FFT section
105 extraction section
106 demodulation section
107 decoding section
108, 301 CRC section
109 propagation loss measurement section
110, 302 transmission power control section
111, 303 transmission control section
112, 305 encoding section
113, 306 modulation section
114, 308 mapping section
115 IFFT section
116 CP addition section
117 radio transmission section
118 signal amplification section 210, 410 contiguous band transmission power calculation section
211, 411 comparison section
212, 412 transmission power resetting section
304, 307 gain control section
413 transmission data selection section
414 SW
415 transmission power gain control section

The invention claimed is:

1. A transmission apparatus that uses a first mode for allocating transmission data to a contiguous frequency band and a second mode for dividing the transmission data into a plurality of clusters and allocating the plurality of clusters to non-contiguous frequency bands, the apparatus comprising:
a control section configured to control a transmission power of the transmission data in accordance with the first mode or the second mode; and
a transmission section configured to transmit the transmission data at the transmission power, wherein
in the first mode, the control section sets the transmission power based on a transmission power control method set for the contiguous frequency band and,
in the second mode,
the control section sets a bandwidth of a first frequency band, which is derived from a lowest frequency in a cluster allocated to a lowest frequency band among the plurality of clusters and a highest frequency in a cluster allocated to a highest frequency band among the plurality of clusters, as a bandwidth of the contiguous frequency band in the first mode, and calculates a first power based on the set bandwidth of the contiguous frequency band and the transmission power control method, and
the control section calculates the transmission power, using the first power and a ratio between the bandwidth of the first frequency band and a bandwidth of a second frequency band that includes the non-contiguous frequency bands to which the plurality of clusters are allocated.

2. The transmission apparatus according to claim 1, wherein, in the second mode, the bandwidth of the first frequency band is set the bandwidth of the first frequency band ranging from the lowest frequency in the cluster allocated to the lowest frequency band among the plurality of clusters to the highest frequency in the cluster allocated to the highest frequency band among the plurality of clusters, as the bandwidth of the contiguous frequency band in the first mode.

3. The transmission apparatus according to claim 1, wherein
the transmission data is data on physical uplink shared channel (PUSCH),
in the first mode, the control section sets the transmission power $P_{PUSCH}(i)$ represented in equation 3 based on the transmission power control method represented in equations 1 and 2, and,
in the second mode,
the control section sets the bandwidth $M_c(i)$ of the first frequency band represented in equation 4, as the bandwidth of the contiguous frequency band in the first mode, and calculates the first power $P'_c(i)$ based on the transmission power control method represented in equations 1 and 2, and
the control section calculates the transmission power $P_{PUSCH}(i)$ represented in equation 5, using the first power $P'_c(i)$ and the ratio between the bandwidth $M_c(i)$ of the first frequency band and the bandwidth $M_{PUSCH}(i)$ of the second frequency band, $$P_C(i)=10\log_{10}(M_C(i))+P_{O\_PUSCH}(j)+\alpha(j)\cdot PL+\Delta_{TF}(i)+f(i) [dBm] \quad (1)$$

where i represents a subframe index, $P_{O\_PUSCH}(j)$ represents a reception target power, PL represents a propagation loss value measured by the transmission apparatus, $\alpha(j)$ represents a coefficient by which the propagation loss value PL is multiplied, $\Delta_{TF}(i)$ represents an offset value corresponding to a modulation scheme, and f(i) represents a cumulative value of control values of closed-Transmission Power Control (TPC), $$P'_C(i)=\min\{P_{CMAX}, P_C(i)\} [dBm] \quad (2)$$

where $P_{CMAX}$ represents a maximum transmission power value set according to the transmission power control method, $$P_{PUSCH}(i)=P'_C(i) [dBm] \quad (3)$$

$$M_C(i)=(f_{high}-f_{low})/B_{RB} [RB] \quad (4)$$

where $f_{low}$ represents the lowest frequency in the cluster allocated to the lowest frequency band among the plurality of clusters, $f_{high}$ represents the highest frequency in the cluster allocated to the highest frequency band among the plurality of clusters, and $B_{RB}$ represents a frequency bandwidth per resource block, $$P_{PUSCH}(i) = P'_C(i) + 10\log_{10}\left(\frac{M_{PUSCH}(i)}{f_{high}-f_{low}}\right) [dBm]. \quad (5)$$

4. The transmission apparatus according to claim 1, wherein
the transmission data is data on physical uplink shared channel (PUSCH),
in the first mode, the control section sets the transmission power $P_{PUSCH}(i)$ represented in equation 3 based on the transmission power control method represented in equations 1 and 2, and
in the second mode,
the control section sets the bandwidth $M_c(i)$ of the first frequency band represented in equation 4, as the bandwidth of the contiguous frequency band in the first mode, and calculates the first power $P'_c(i)$ based on the transmission power control method represented in equations 1 and 2, and
the control section calculates the transmission power $P_{PUSCH}(i)$ represented in equation 5, using the first power $P'_c(i)$ and the ratio between the bandwidth $M_c(i)$ of the first frequency band and the bandwidth $M_{PUSCH}(i)$ of the second frequency band, $$P_C(i)=10\log_{10}(M_C(i))+P_{O\_PUSCH}(j)+\alpha(j)\cdot PL+\Delta_{TF}(i)+f(i) [dBm] \quad (1)$$

where i represents a subframe index, $P_{O\_PUSCH}(j)$ represents a reception target power, PL represents a propagation loss value measured by the transmission apparatus, $\alpha(j)$ represents a coefficient by which the propagation loss value PL is multiplied, $\Delta_{TF}(i)$ represents an offset value corresponding to a modulation scheme, and f(i) represents a cumulative value of control values of closed-Transmission Power Control (TPC), $$P'_C(i)=\min\{P_{CMAX}, P_C(i)\} [dBm] \quad (2)$$

where $P_{CMAX}$ represents the maximum transmission power value set according to the transmission power control method, $$P_{PUSCH}(i)=P'_C(i) [dBm] \quad (3)$$

$$M_C(i)=n_{high}^{RB}-n_{low}^{RB}+1 [RB] \quad (4)$$

where $n_{low}^{RB}$ represents a resource block index of a resource block corresponding to the lowest frequency in the cluster allocated to the lowest frequency band among the plurality of clusters, and $n_{high}^{RB}$ represents a resource block index of a resource block corresponding to the highest frequency in the cluster allocated to the highest frequency band among the plurality of clusters, $$P_{PUSCH}(i) = P'_C(i) + 10\log_{10}\left(\frac{M_{PUSCH}(i)}{M_C(i)}\right)[\text{dBm}]. \quad (5)$$

5. A transmission apparatus that independently controls a transmission power of first transmission data and a transmission power of second transmission data, the apparatus comprising:
   a determination section configured to compare a determination parameter with a determination reference and to determine whether to simultaneously transmit the first transmission data and the second transmission data or transmit only any one of the first transmission data and the second transmission data; and
   a transmission section configured to transmit the first transmission data and the second transmission data based on a determination result of the determination section,
   wherein
   the determination parameter is a power value calculated by multiplying a first parameter by a second parameter, the first parameter being a higher transmission power per frequency between a first transmission power spectral density that is a transmission power of the first transmission data per frequency and a second transmission power spectral density that is a transmission power of the second transmission data per frequency, and the second parameter being a bandwidth of a frequency band ranging from a lowest frequency in the transmission data allocated to a lowest frequency band in the first transmission data and the second transmission data to a highest frequency in the transmission data allocated to a highest frequency band in the first transmission data and the second transmission data.

6. The transmission apparatus according to claim 5, wherein, when the determination parameter is equal to or smaller than the determination reference, the determination section determines to simultaneously transmit the first transmission data and the second transmission data, and when the determination parameter is larger than the determination reference, the determination section determines to transmit only any one of the first transmission data and the second transmission data.

7. The transmission apparatus according to claim 5, wherein, in a case where the first transmission data or the second transmission data is performed frequency-hopping between a plurality of slots in one subframe, the determination parameter is the power value calculated using a widest bandwidth among a plurality of bandwidths calculated for each of the plurality of slots in the one subframe.

8. The transmission apparatus according to claim 5,
   wherein the first transmission data is data on physical uplink shared channel (PUSCH), and the second transmission data is data on physical uplink control channel (PUCCH), and
   the determination parameter $P_C(i)$ represented in equation 1 is the power value calculated by multiplying the first parameter by the second parameter, the first parameter being the higher transmission power per frequency between the first transmission power spectral density represented in equation 2 and the second transmission power spectral density represented in equation 3, and as represented in equation 4, the second parameter being the bandwidth $M_C(i)$ of the frequency band ranging from the lowest frequency $f_{low}$ in the transmission data allocated to the lowest frequency band in the first transmission data and the second transmission data to the highest frequency $f_{high}$ in the transmission data allocated to the highest frequency band in the first transmission data and the second transmission data, $$P_C(i)=10\log_{10}(M_C(i))+\max\{P_{PUSCH\_1RB}(i), P_{PUCCH\_1RB}(i)\} \quad (1)$$

where i represents a subframe index, $$P_{PUSCH\_1RB}(i)=P_{O\_PUSCH}+\alpha \cdot PL+\Delta_{TF}(i)+f(i) \quad (2)$$

where $P_{O\_PUSCH}$ represents a reception target power of the first transmission data, PL represents a propagation loss value measured by the transmission apparatus, $\alpha$ represents a coefficient by which the propagation loss value PL is multiplied, $\Delta_{TF}(i)$ represents an offset value corresponding to a modulation scheme, and f(i) represents a cumulative value of control values of closed-Transmission Power Control (TPC) for the first transmission data, $$P_{PUCCH\_1RB}(i)=P_{O\_PUCCH}+PL+h+\Delta_F(i)+g(i) \quad (3)$$

where $P_{O\_PUCCH}$ represents a reception target power of the second transmission data, h and $\Delta_F$ represent offset values corresponding to a transmission format of the second transmission data, and g(i) represents a cumulative value of control values of closed-Transmission Power Control (TPC) for the second transmission data, $$M_C(i)=(f_{high}-f_{low})/B_{RB}[RB] \quad (4)$$

where $B_{RB}$ represents a frequency bandwidth per resource block.

9. The transmission apparatus according to claim 5, wherein
   the first transmission data is data on physical uplink shared channel (PUSCH) and the second transmission data is data on physical uplink control channel (PUCCH), and
   the determination parameter $P_C(i)$ represented in equation 1 is a power value calculated by multiplying the first parameter by the second parameter, the first parameter being the higher transmission power per frequency between the first transmission power spectral density represented in equation 2 and the second transmission power spectral density represented in equation 3, and as represented in equation 4, the second parameter being the bandwidth $M_C(i)$ of a frequency band ranging from a resource block having a resource block index $n_{low}^{RB}$ corresponding to the lowest frequency in the transmission data allocated to the lowest frequency band in the first transmission data and the second transmission data to a resource block having a resource block index $n_{high}^{RB}$ corresponding to the highest frequency in the transmission data allocated to the highest frequency band in the first transmission data and the second transmission data, $$P_C(i)=10\log_{10}(M_C(i))+\max\{P_{PUSCH\_1RB}(i), P_{PUCCH\_1RB}(i)\} \quad (1)$$

where i represents a subframe index, $$P_{PUSCH\_1RB}(i)=P_{O\_PUSCH}+\alpha \cdot PL+\Delta_{TF}(i)+f(i) \quad (2)$$

where $P_{O\_PUSCH}$ represents a reception target power of the first transmission data, PL represents a propagation loss value measured by the transmission apparatus, $\alpha$ represents a coefficient by which the propagation loss value PL is multiplied, $\Delta_{TF}(i)$ represents an offset value corresponding to a modulation scheme, and f(i) represents a cumulative value of control values of closed-Transmission Power Control (TPC) for the first transmission data, $$P_{PUCCH\_1RB}(i) = P_{O\_PUCCH} + PL + h + \Delta_F(i) + g(i) \quad (3)$$

where $P_{O\_PUCCH}$ represents a reception target power of the second transmission data, h and $\Delta_F$ represent offset values corresponding to a transmission format of the second transmission data, and g(i) represents a cumulative value of control values of closed-Transmission Power Control (TPC) for the second transmission data, $$M_C(i) = n_{high}^{RB} - n_{low}^{RB} + 1 \, [RB] \quad (4)$$

10. A transmission power control method in a transmission apparatus using a first mode for allocating transmission data to a contiguous frequency band and a second mode for dividing the transmission data into a plurality of clusters and allocating the plurality of clusters to non-contiguous frequency bands, the method comprising:
controlling a transmission power of the transmission data in accordance with the first mode or the second mode;
transmitting the transmission data at the controlled transmission power;
in the first mode, setting the transmission power based on a transmission power control method set for the contiguous frequency band;
in the second mode,
setting a bandwidth of a first frequency band, which is derived from a lowest frequency in a cluster allocated to a lowest frequency band among the plurality of clusters and a highest frequency in a cluster allocated to a highest frequency band among the plurality of clusters, as a bandwidth of the contiguous frequency band in the first mode,
calculating a first power based on the set bandwidth of the contiguous frequency band and the transmission power control method; and
calculating the transmission power, using the first power and a ratio between the bandwidth of the first frequency band and a bandwidth of a second frequency band that includes the non-contiguous frequency bands to which the plurality of clusters are allocated.

11. A transmission determination method in a transmission apparatus for independently controlling a transmission power of first transmission data and a transmission power of second transmission data, the method comprising:
comparing a determination parameter with a determination reference;
determining whether to simultaneously transmit the first transmission data and the second transmission data or transmit only any one of the first transmission data and the second transmission data; and
transmitting the first transmission data and the second transmission data based on a result of the determining, wherein
the determination parameter is a power value calculated by multiplying a first parameter by a second parameter, the first parameter being a higher transmission power per frequency between a transmission power of the first transmission data per frequency and a transmission power of the second transmission data per frequency, and the second parameter being a bandwidth of a frequency band ranging from a lowest frequency in the transmission data allocated to a lowest frequency band in the first transmission data and the second transmission data to a highest frequency in the transmission data allocated to a highest frequency band in the first transmission data and the second transmission data.

* * * * *